United States Patent
Fujii et al.

(10) Patent No.: US 7,071,426 B2
(45) Date of Patent: Jul. 4, 2006

(54) COMBINATION WEIGHING DEVICE WITH MULTI-LAYERED HOPPERS HAVING CONTROLLABLE SUPPLY FUNCTION

(75) Inventors: Masaya Fujii, Ritto (JP); Takumi Kawamura, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 282 days.

(21) Appl. No.: 10/728,914

(22) Filed: Dec. 8, 2003

(65) Prior Publication Data
US 2004/0134689 A1   Jul. 15, 2004

(30) Foreign Application Priority Data
Dec. 9, 2002  (JP) ............................. 2002-356363
Dec. 11, 2002  (JP) ............................. 2002-358920

(51) Int. Cl.
*G01G 19/387*  (2006.01)
(52) U.S. Cl. ................................. 177/25.18
(58) Field of Classification Search ............. 177/25.18
See application file for complete search history.

(56) References Cited

U.S. PATENT DOCUMENTS

| 4,508,186 A | * | 4/1985 | Sashiki et al. ................ 177/1 |
| 4,515,231 A | | 5/1985 | Ishida |
| 4,565,253 A | | 1/1986 | Berlebner et al. |
| 5,859,389 A | | 1/1999 | Tatsuoka et al. |

FOREIGN PATENT DOCUMENTS

| EP | 0640814 A | | 3/1995 |
| EP | 1429126 A2 | * | 6/2004 |
| JP | 2-655 | | 7/1983 |
| JP | 63-250528 A | | 10/1988 |
| JP | 63-250528 A | | 10/1988 |
| JP | 07-063599 A | | 3/1995 |

* cited by examiner

Primary Examiner—Randy W. Gibson
(74) Attorney, Agent, or Firm—SHINJYU Global IP

(57) ABSTRACT

In a combination weighing device, weight measurement devices are respectively connected to pool hoppers and weighing hoppers. When the results of a combination calculation indicate that a combination is not complete, a control unit determines whether or not a total value of a weight value from predetermined weighing hoppers and a weight value from pool hoppers that supply articles to the weighing hoppers exceeds a predetermined value. Thus, an over-scale state in the weighing hoppers can be avoided by supplying additional articles stored in the pool hoppers to the weighing hoppers. The present invention provides a combination weighing device that is capable of improving operational efficiency.

12 Claims, 20 Drawing Sheets

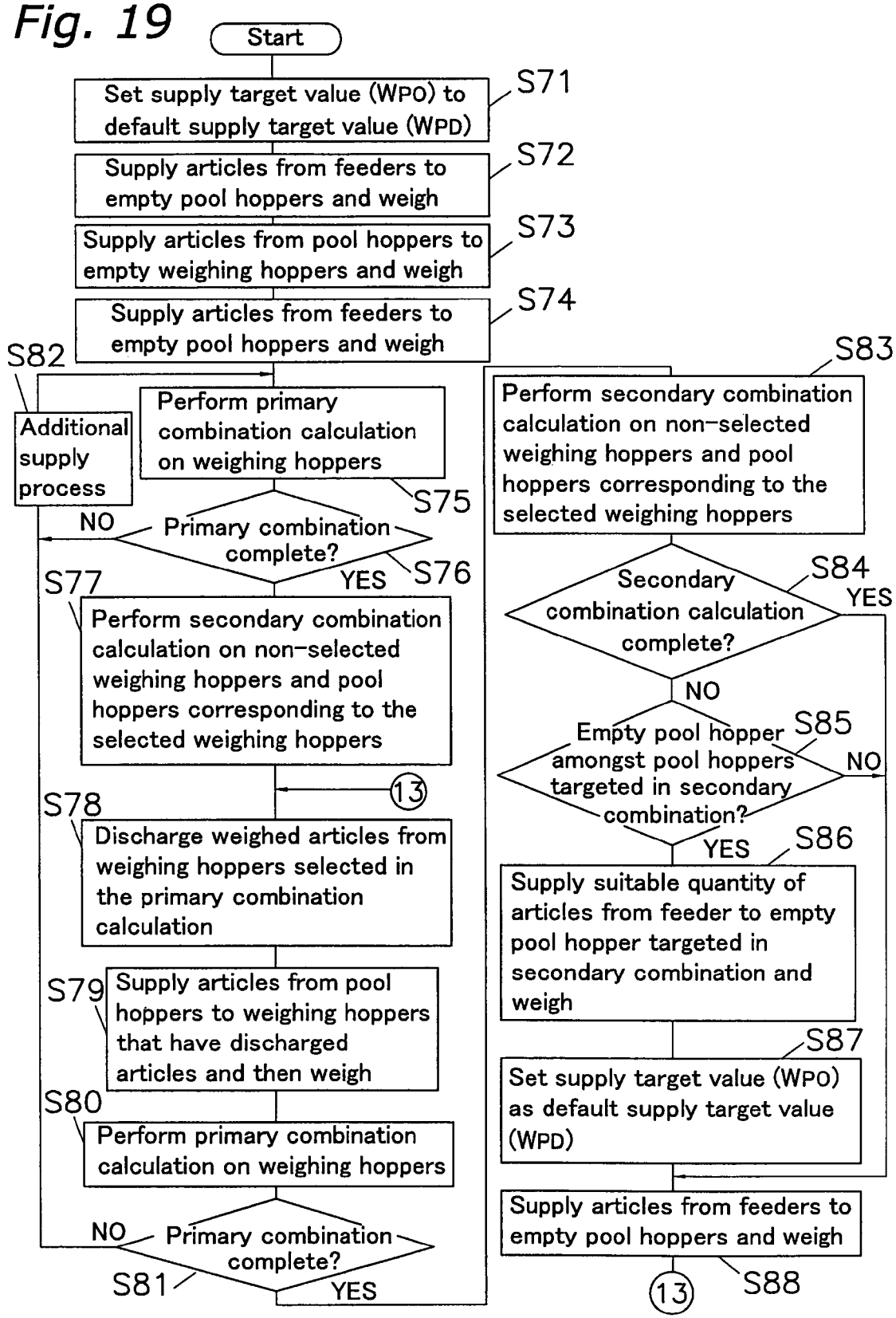

COMBINATION WEIGHING DEVICE WITH MULTI-LAYERED HOPPERS HAVING CONTROLLABLE SUPPLY FUNCTION

BACKGROUND OF THE INVENTION

1. Field of the Invention

The present invention generally relates to a combination weighing device. More specifically, the present invention relates to a combination weighing device that weighs articles with a plurality of weighing devices, and weighs articles in a predetermined target weight based upon these weight results.

2. Background Information

Amongst those weighing devices employed in a wide variety of applications, there are combination weighing devices that are employed to combine articles that do not have fixed and uniform weights, such as agricultural products, marine products, snack foods, or the like, into a combination that has a predetermined target weight. In this combination weighing device, articles are respectively distributed and supplied to weighing hoppers in order to measure the weights thereof, and a combination calculation is performed based upon these weight values. Then, a combination is selected that has a weight that matches the target weight or a weight the nearest to the target weight within a predetermined allowable range, and the articles are discharged from only the weighing hoppers in this selected combination.

In these types of combination weighing devices, there are those which are designed to increase the probability that the weight of a combination will fall within an allowable range with respect to the target weight and thus improve operational efficiency. For example, a combination weighing device in which the pool hoppers thereof also possess a weighing function has been proposed (e.g., see Japanese Published Patent Application No. S63-250528, pp. 2–3).

According to this device, both the weight values of articles in the weighing hoppers and the weight values of articles in the pool hoppers participate in the combination calculation, and thus the number of participating weight values during the combination calculation will reliably increase. Thus, there is a high probability that combinations will be completed.

In addition, a combination weighing device has been proposed in which the pool hoppers thereof possess a weighing function, and which supply articles to the weighing hoppers after the articles supplied from feeders (supply troughs) to the pool hoppers are measured into approximately predetermined weights by the pool hoppers (e.g., see Japanese Published Utility Model No. H02-655, pp. 1–3).

According to this device, an oversupply of articles to the weighing hoppers will be prevented when very small quantities of articles are supplied with vibrating feeders, and thus there is a high probability that combinations will be completed. In other words, in a combination weighing device that includes, for example, 10–12 weighing hoppers, a supply target value of articles to be supplied to each weighing hopper is set so that a combination will normally be complete with the weight values of 3,4 weighing hoppers. Thus, according to this combination weighing device, the weight of the articles supplied to the weighing hoppers will be close to the supply target value, and thus there is a high probability that combinations will be completed.

In addition, a combination weighing device has been proposed that controls the drives of the feeders (feeder drives) based upon a comparison between the weight values of the articles in the weight hoppers and the supply target value of the articles supplied to the weighing hoppers (e.g., see Japanese Published Patent Application No. H07-63599, pp. 3–5).

According to this device, articles with weights that are close to the supply target value are supplied to each weighing hopper, and thus there is a high probability that combinations will be completed for the reasons noted above.

Furthermore, there are devices which are designed to increase the probability that the weight of a combination will fall within an allowable range with respect to the target weight and thus improve operational efficiency. For example, a combination weighing device has been proposed in which articles from the weighing hoppers may be discharged in two directions—toward booster hoppers (auxiliary hoppers) and toward a collection chute (e.g., see Japanese Published Patent Application No. H07-63599, p. 6 and FIG. 5).

According to this device, both the weight values of articles in the weighing hoppers and the weight values of articles in the booster hoppers participate in the combination calculation, and thus there is a high probability that combinations will be completed because the number of weight values that participate in the combination calculation will reliably increase.

When a combination is not complete, these types of combination weighing devices supply additional articles from the pool hoppers to the weighing hoppers, and then perform a combination calculation again.

If these types of combination weighing devices are configured to supply additional articles to specific weighing hoppers, there is the possibility that an abnormality referred to as over-scale will occur if additional articles are repeatedly supplied thereto. Over-scale is an abnormal state caused when the weight of supplied articles exceeds a weight limit of the weighing hoppers or the volume of supplied articles exceeds the maximum allowed capacity of the weighing hoppers. If an over-scale state occurs, the combination weighing device will be compelled to cease operations, and thus operational efficiency will decline. in the combination weighing devices disclosed in the aforementioned However, this problem are not addressed Japanese Published Patent Application No. S63-250528, Japanese Published Utility Model No. H02-655, or Japanese Published Patent Application No. H07-63599.

First, the combination weighing device disclosed in Japanese Published Utility Model No. H02-655 does not perform feedback control of the quantity of articles supplied from the feeders based upon the weight values of articles in the pool hoppers.

In addition, the combination weighing device disclosed in Japanese Published Patent Application No. H07-63599 determines the weight values of the first articles supplied to the weight hoppers. Thus, for example, in the event that feedback control is to be performed on the quantity of articles supplied by the feeders, it will be too late to do so if articles have already been supplied to the pool hoppers that supply articles from the feeders to the weighing hoppers in order to increase the speed of the process. The results of the feedback control will only be reflected in the next groups of articles supplied to the pool hoppers. This will create problems in the responsiveness and convergence of the control.

In addition, even though the combination weighing devices disclosed in Japanese Published Patent Application Nos. H07-63599 and S63-250528 will complete combinations with a high probability, these devices will not supply additional articles in situations in which a combination is finished in an incomplete state. With respect to the steps to be taken when a combination is incomplete, Japanese Published Patent Application No. H07-63599 discloses only that "all of the articles in the weighing hoppers will be discharged out of the system via the collection chute", and thus one can only conclude that the aforementioned object of improving operational efficiency remains to be solved.

In view of the above, it will be apparent to those skilled in the art from this disclosure that there exists a need for an improved combination weighing device that overcomes the above-discussed problems of the conventional combination weighing devices. This invention addresses this need in the art as well as other needs, which will become apparent to those skilled in the art from this disclosure.

SUMMARY OF THE INVENTION

Accordingly, an object of the present invention is to take the aforementioned situation into consideration and provide a combination weighing device that is capable of increasing operational efficiency.

The combination weighing device according to the first aspect of the present invention includes a plurality of sets of hoppers, each set having a first hopper and a second hopper, a plurality of measuring devices, calculating means, determining means, and additional supply means. The plurality of first hoppers store articles. The plurality of second hoppers are disposed above the plurality of first hoppers, each second hopper respectively corresponding to each first hopper and supplying articles to the corresponding first hopper. The plurality of measuring devices are arranged with respect to each of the plurality of first hoppers and plurality of second hoppers, the plurality of measuring devices measuring articles in the first hoppers or the second hoppers. The calculating means performs combination calculation based on measurement values of articles of the first hoppers provided by the measuring devices. The determining means determines whether or not a total measurement value of articles in first and second hoppers of one of the sets of hoppers exceeds a predetermined value when a combination in a combination calculation performed by the calculating means was not complete. The total value is the sum of measurement values of articles in the first and second hoppers of the same set. The additional supply means supplies additional articles from a second hopper to a first hopper when the determining means determines that the total value does not exceed the predetermined value.

According to this invention, when a combination is not complete, the presence or absence of an over-scale state in a first hopper can be predicted, and thus additional articles can be supplied without resulting in an over-scale state when additional articles are supplied from a second hopper to a first hopper. Thus, having to cease operations due to an over-scale state can be avoided and operational efficiency can be improved.

The combination weighing device according to the second aspect of the present invention is the combination weighing device according to the first aspect of the present invention, wherein the determining means determines when the total measurement value of articles in first and second hoppers of the one of the sets of hoppers exceeds the predetermined value, whether or not the total measurement value of articles in first and second hoppers of another set of hoppers exceeds the predetermined value.

Here, a plurality of first hoppers targeted for a predetermined additional supply are set, and a determination whether or not the total value exceeds the predetermined value can be sequentially executed with regard to each first hopper. Thus, the efficiency of combination completion will be increased.

The combination weighing device according to the third aspect of the present invention is the combination weighing device according to the first or second aspect of the present invention, in which the predetermined value is the weight of articles in the first hopper that can be measured by the weighing device.

Here, an over-scale state caused by supplying articles at a weight that exceeds a weight limit of a first hopper can be effectively avoided.

The combination weighing device according fourth aspect of the present invention is the combination weighing device according to the first or second aspect of the present invention, in which the predetermined value is a value based upon the density of an article and the volume of articles that a first hopper can accommodate.

Here, an over-scale state caused by supplying a volume of articles that exceeds the total allowable capacity of a first hopper can be effectively avoided.

The combination weighing device according to the fifth aspect of the present invention is the combination weighing device according to one of the first through fourth aspects of the present invention, and further includes a plurality of feeders, supply quantity control means, and setting means. Each of the plurality of feeders respectively corresponds to each second hopper, and supplies articles to the corresponding second hoppers. The supply quantity control means controls the quantity of articles supplied from the feeder to the second hopper. The setting means sets a supply target value of articles supplied to the second hopper by the feeder. The supply quantity control means controls the supply quantity based upon the weight value of articles in the second hopper so that the quantity of articles supplied from the feeder to the second hopper will equal the supply target value.

According to this invention, by supplying articles having a weight that does not exceed a value obtained by subtracting the total value from the predetermined value from a feeder to a second hopper, it can be assured that an over-scale state will be avoided when additional articles are supplied from the second hopper to a corresponding first hopper.

The combination weighing device according to the sixth aspect of the present invention is the combination weighing device according to the fifth aspect of the present invention, wherein the supply quantity control means controls the quantity of article to be supplied from the feeders to the second hopper of the set of hoppers based upon a deviation between the measurement value of articles in the second hopper of the set of hoppers and the predetermined supply target value.

When the quantity of articles supplied by the feeders is feedback controlled based upon the weight values from the first hoppers, the weight values of the articles supplied from the second hoppers to the first hoppers can be determined, and thus feedback control will be performed based upon the weight values from this point. According to the sixth aspect of the invention, feedback control of the quantity of articles supplied by the feeders can be performed based upon the weight values of articles at the point they are supplied from the feeders to the second hoppers. Because of this, the time lag from the point at which the weight value of this portion is determined to the point at which feedback control is executed will be reduced, and both responsiveness and convergence to the control will be improved. In other words, an increase in process speed will be achieved and operating efficiency will improve.

Then, because the quantity of articles supplied from the feeders to the second hoppers is managed with good accuracy with respect to the supply target weight, there will be a high probability that combinations will be completed and thus operational efficiency will improve.

A combination weighing device according to the seventh aspect of the present invention includes a plurality of first hoppers, a plurality of second hoppers, a plurality of feeders, supply quantity control means, a plurality of measuring devices, and calculating means. The plurality of first hoppers store articles. The plurality of second hoppers are disposed above the plurality of first hoppers, each second hopper respectively corresponding to each first hopper and supplying articles to the corresponding first hopper. The plurality of feeders respectively correspond to each second hopper, and supply articles to the corresponding second hoppers. The supply quantity control means controls the quantity of articles supplied from the feeders to the second hoppers. The plurality of measuring devices are arranged with respect to each of the plurality of first hoppers and plurality of second hoppers, and weigh articles in the first hoppers or second hoppers. The calculating means employs measurement values of articles provided by the measuring devices to perform combination calculations. The supply quantity control means controls the quantity of articles supplied from the feeders to the second hoppers based upon the deviation between the measurement value of articles in the second hoppers and the supply target value of articles supplied from the feeders to the second hoppers.

According to this invention, at the point at which articles are supplied from the feeders to the second hoppers, feedback control of the quantity of articles supplied by the feeders is performed based upon the weight values, and thus the time lag from the point at which the weight values are determined to the point at which feedback control is executed will be reduced when compared to situations in which it is based upon weight values from the first hoppers, and both responsiveness and convergence to the control will be improved. In other words, an increase in process speed will be achieved and operating efficiency will improve.

Then, because the amount of articles supplied from the feeders to the second hopers is managed with good accuracy with respect to the supply target weight, there will be a high probability that combinations will be completed and thus operational efficiency will improve.

A combination weighing device according to the eight aspect of the present invention includes a plurality of first hoppers, a plurality of second hoppers, a plurality of feeders, supply quantity control means, a plurality of weighing devices, and calculating means. The plurality of first hoppers store articles. The plurality of second hoppers are disposed above the plurality of first hoppers, each second hopper respectively corresponding to each first hopper and supplying articles to the corresponding first hopper. The plurality of feeders respectively correspond to each second hopper, and supply articles to the corresponding second hoppers. The supply quantity control means controls the quantity of articles supplied from the feeders to the second hoppers. The plurality of measuring devices are arranged with respect to each of the plurality of first hoppers and plurality of second hoppers, and measure articles in the first hoppers or second hoppers. The calculation means performs combination calculation based on measurement values of articles of the first hoppers provided by the measuring devices. Then, the supply quantity control means controls the quantity of articles to be supplied from the feeders to the second hoppers so that the total of the weight value of articles in the second hopper and the weight value of articles in the first hoppers that correspond to the second hoppers does not exceed the predetermined value.

According to this invention, when the results of a combination calculation indicate that a combination is not completed and thus articles are supplied from the second hoppers to the first hoppers, the quantity of articles supplied from the feeders to the second hoppers is controlled so that an over-scale state is not generated in the first hoppers. In other words, an over-scale state that causes the combination weighing device to cease operations will be avoided. Note that over-scale is an abnormal state caused when the weight of supplied articles exceeds a weight limit of the weighing hoppers or the volume of supplied articles exceeds the maximum allowed capacity of the weighing hoppers.

A combination weighing device according to the ninth aspect of the present invention includes a plurality of sets of hoppers, each set having a first hopper that stores articles and a second hoppers that is disposed above the first hopper to supply articles to the first hopper, a plurality of measuring devices, calculating means, determining means, selection means, and additional supply means. The plurality of first hoppers store articles. The plurality of second hoppers are disposed above the plurality of first hoppers, each second hopper respectively corresponding to each first hopper and supplying articles to the corresponding first hopper. The plurality of measuring devices that are arranged with respect to each of the plurality of first hoppers and plurality of second hoppers, and measure articles in the first hoppers or second hoppers. The calculating means performs combination calculation based on measurement values of articles of the first hoppers provided by the measuring devices. The determining means determines whether the combination calculation performed by the calculation means is complete. The selection means performs combination calculation based on measurement values of articles of the first and second hoppers when the combination calculation performed by the calculating means was not complete. The additional supply means supplies articles from the second hopper selected by the selection means to the corresponding first hopper if the selection means selects the second hopper as a result of the combination calculation.

According to this invention, even if the results of a combination calculation indicate that a combination is not complete, additional articles will be supplied from the second hopper to the first hopper so that the combination will be complete and thus additional supply is an effective means of dealing with incomplete combinations.

A combination weighing device according to the tenth aspect of the present invention includes a plurality of sets of hoppers, each set having a first hopper that stores articles and a second hopper that is disposed above the first hopper to supply articles to the first hopper, a plurality of measuring devices, calculating means, and secondary calculation means. The plurality of first hoppers store articles. The plurality of second hoppers are disposed above the plurality of first hoppers, each second hopper respectively corresponding to each first hopper and supplying articles to the corresponding first hopper. The plurality of measuring devices are arranged with respect to each of the plurality of first hoppers and plurality of second hoppers, and weigh articles in the first hoppers or second hoppers. The calculation means performs combination calculation based on measurement values of articles of the first hoppers provided by the measuring devices. The secondary calculating means performs, when a combination in the combination calculation performed by the calculating means was complete, combination calculation based on measurement values of articles in the second hoppers and the first hoppers not selected in the combination calculation performed by the calculation means.

According to this invention, whether or not a combination in the next combination calculation will be complete or not can be predicted by performing a secondary combination calculation based upon the results of a combination calculation on the present weight values. In other words, when an incomplete combination is predicted, operational efficiency will be increased because steps can be taken toward completion.

The combination weighing device according to the eleventh aspect of the present invention is the combination weighing device according to the tenth aspect of the present invention, and further includes a plurality of feeders and supply quantity control means. The plurality of feeders respectively correspond to each second hopper, the plurality of feeders supplying articles to the corresponding second hoppers. The supply quantity control means controls the quantity of articles supplied from the feeders to the second hoppers. Then, when a combination in the secondary combination calculation performed by the secondary calculation means is not complete and there is an empty second hopper, the supply quantity control means controls the quantity of articles supplied from the feeders to the empty second hopper such that the combination calculation performed by the secondary combination calculation means can be completed.

According to this invention, when the results of a secondary combination calculation predict that a secondary combination will be incomplete, the next combination will be reliably completed because a sufficient quantity of articles will be supplied from the feeders to the second hoppers so that the secondary combination will be complete.

The combination weighing device according to the twelfth aspect of the present invention is the combination weighing device according to the tenth or eleventh aspect, in which the calculating means determines whether a plurality of combinations in one combination calculation are complete or not. Then, when a plurality of combinations are complete, the calculating means selects from amongst that plurality of combinations a combination that completes a secondary combination calculation performed by the secondary combination calculating means.

According to this invention, a combination that will complete a secondary combination calculation can be selected from amongst the plurality of completed combinations. Thus, the accuracy of combinations can be maintained as the next primary combination is completed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11($b$) is schematic diagram for describing an article supply/discharge operation in accordance with the second embodiment of the present invention;

FIG. 11($c$) is schematic diagram for describing an article supply/discharge operation in accordance with the second embodiment of the present invention;

FIG. 11($d$) is schematic diagram for describing an article supply/discharge operation in accordance with the second embodiment of the present invention;

FIG. 12($b$) is schematic diagram for describing an article supply/discharge operation in accordance with the second embodiment of the present invention;

FIG. 12($c$) is schematic diagram for describing an article supply/discharge operation in accordance with the second embodiment of the present invention;

FIG. 13($b$) is schematic diagram for describing an article supply/discharge operation in accordance with the second embodiment of the present invention;

FIG. 13($c$) is schematic diagram for describing an article supply/discharge operation in accordance with the second embodiment of the present invention;

FIG. 16($b$) is schematic diagram for describing an article supply/discharge operation in accordance with the modification D of the second embodiment of the present invention;

FIG. 19 is a flowchart for describing another control in accordance with the modification F of the second embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

A combination weighing device according to a first embodiment of the present invention will be described below.

Figure 1:
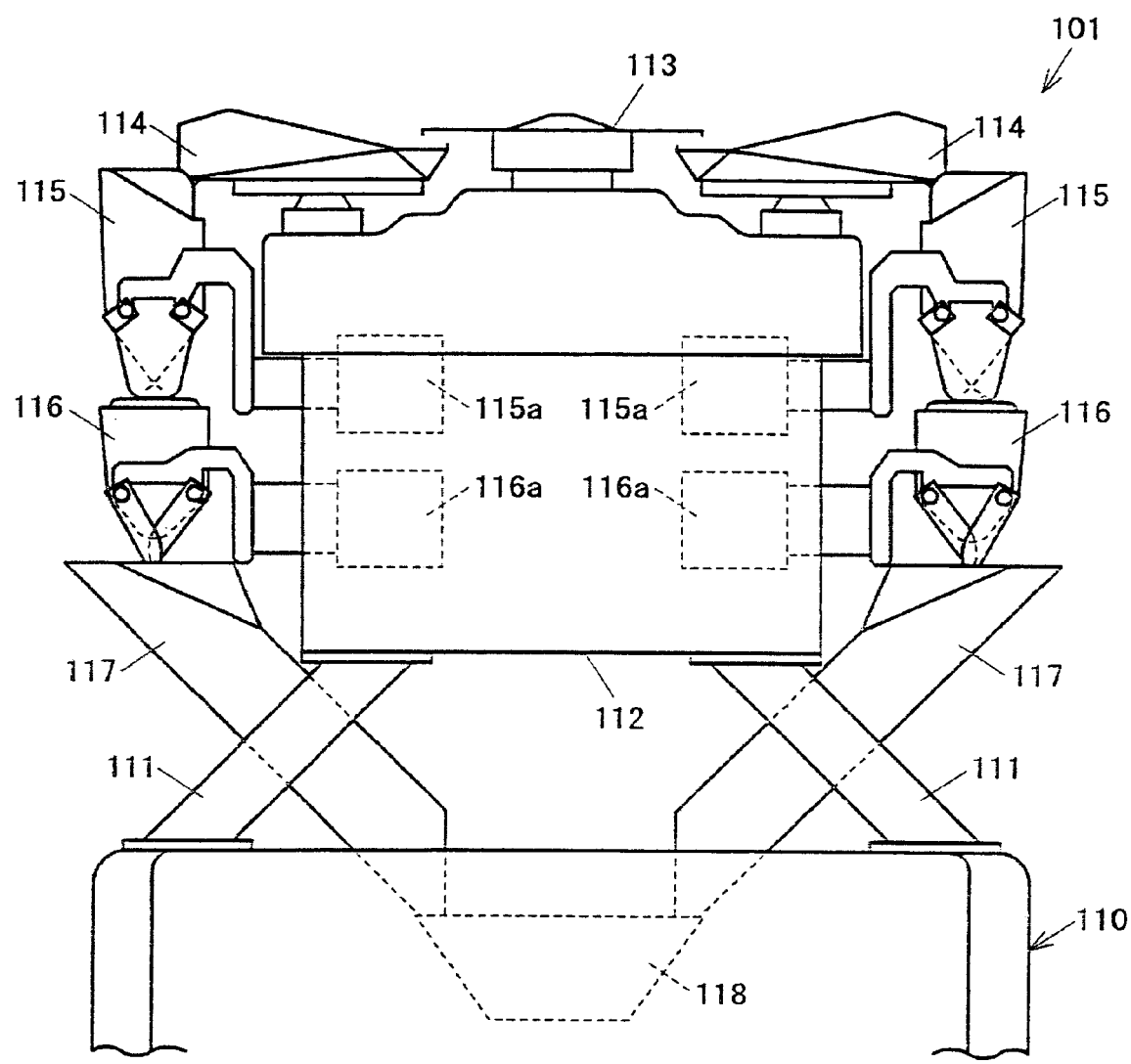
FIG. 1 is a lateral view illustrating the essential elements of a combination weighing device in accordance with a first embodiment of the present invention.

As shown in FIG. 1, a combination weighing device 101 includes a box shaped main case 112 that is supported by a plurality of support legs 111—111 on top of a frame 110. A dispersion table 113 that disperses articles such as snack foods and candy, a plurality of feeders 114—114 that are disposed in a radiating pattern around the periphery of the dispersion table 113, pool hoppers 115—115 (example of second hoppers) that are vertically paired with each of the feeders 114—114, and weighing hoppers 116—116 (example of first hoppers) are attached to the main case 112. Each of the weighing hoppers 116—116 is vertically paired with the pooling hoppers 115—115, such that there are a plurality of sets of a weighing hopper 116 and a pooling hopper 115. Weight detectors 115a—115a, 116a—16a (examples of measuring devices) that are composed of load cells or the like are each connected to the pool hoppers 115—115 and the weighing hoppers 116—116. The weight of articles supplied by the pool hoppers 115—115 and the weighing hoppers 116—116 is measured by the weight detectors 115a—15a, 116a—16a.

The articles supplied to the combination weighting device 101 by means of a supply device (not shown in the figures) or by manually supplying the same are first approximately uniformly dispersed to the feeders 114—114 by vibrating the dispersion table 113, and then supplied from the vibrating feeders 114—114 to the weighing hoppers 116—116 in suitable quantities via the pool hoppers 115—115. Then, the weights of each of the articles are measured with the weighting hoppers 116—116 and a combination calculation is performed.

Individual chutes 117—117 are disposed below each weighing hopper 116—116. Based on the results of the combination calculation, articles are discharged from the weighing hoppers 116—116 in the combination to the individual chutes 117—117. The articles discharged and dropped into the individual chutes 117—117 are collected by means of a funnel shaped collection chute 118 disposed in the approximate center of the combination weighing device 101, and the articles are then supplied to a packaging device or the like that is on the downstream side of the collection chute 118.

Figure 2:
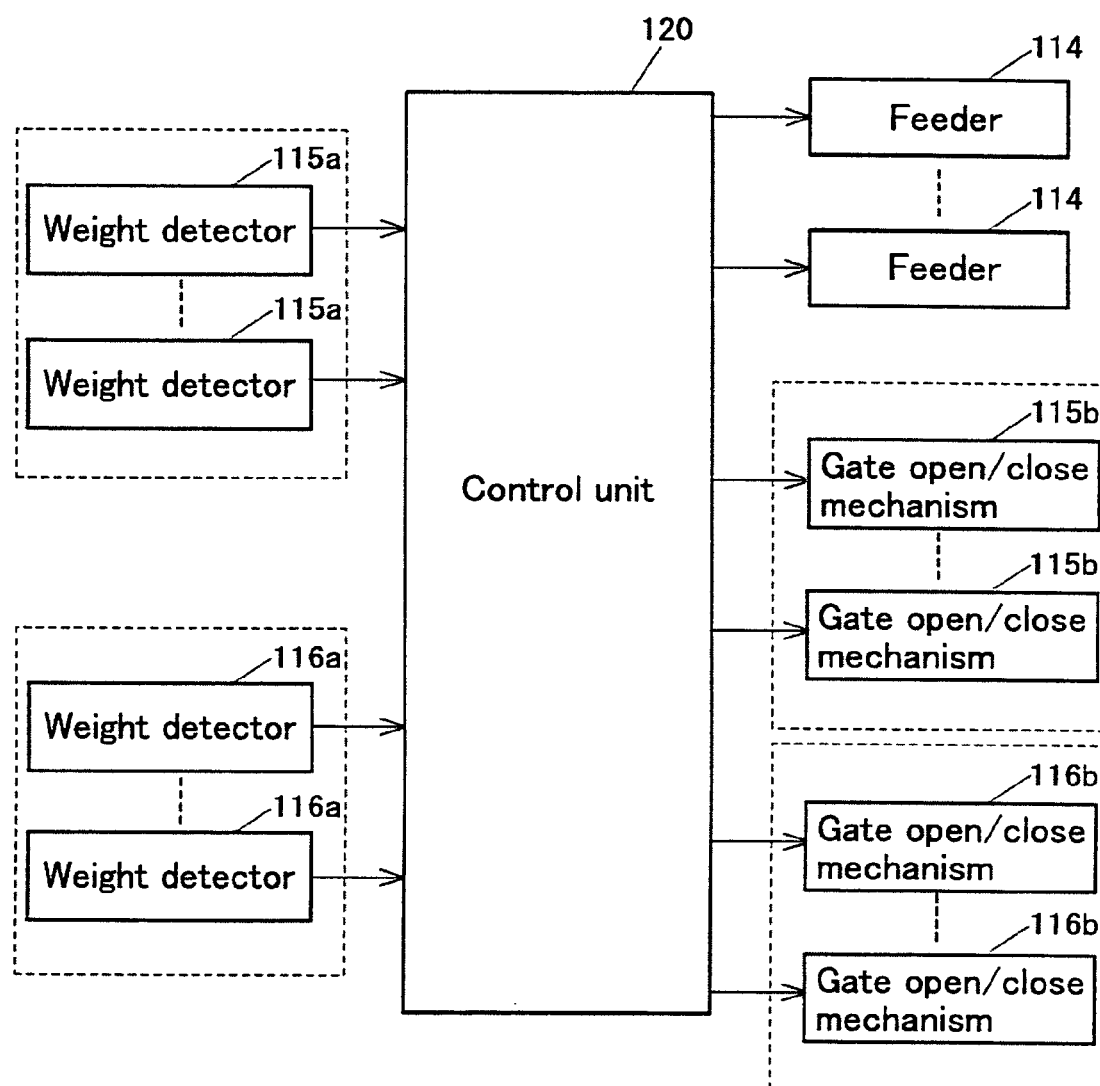
FIG. 2 is a block diagram of a control system in accordance with the first embodiment of the present invention.

As shown in FIG. 2, a control system for the combination weighing device 101 includes a control unit 120 that comprehensively controls the combination weighing device 101.

The control unit 120 preferably includes a microcomputer with a control program that controls the combination weighing device 101 as discussed below. The control unit 120 can also include other conventional components such as an input interface circuit, an output interface circuit, and storage devices such as a ROM (Read Only Memory) device and a RAM (Random Access Memory) device. The control unit 120 is operatively coupled to the weight detectors 115a and 116a, the feeders 114, and the gate open/close mechanisms 115b and 116b in a conventional manner as shown in FIG. 2. The control unit 120 is capable of selectively controlling any of the components of the combination weighing device 101 in accordance with the control program. It will be apparent to those skilled in the art from this disclosure that the precise structure and algorithms for control unit 120 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control unit 120 inputs weight signals from the weight detectors 116a—16a provided in each weighing hopper 116—116, performs a combination calculation based on these weight signals, and selects a combination in which the combined weight of the articles either matches a target weight or is closest to the target weight within an allowable range.

In addition, the control unit 120 inputs weight signals from the weight detectors 115a—15a provided in the pool hoppers 115—115, determines whether to supply additional articles from the pool hoppers 115—115 to the weighing hoppers 116—116 when the combination is incomplete based on both these weight signals and the weight signals from the weight detectors 116a—16a of the weighing hoppers 116—116, and determines if it is possible to supply additional articles. Then, the control unit 120 establishes the quantity of the articles to be supplied from the feeders 114—114 to the pool hoppers 115—115 in order to smoothly supply additional articles.

In addition, the control unit 120 inputs weight signals from the weight detectors 115a—15a of the pool hoppers 115—115, and conducts feedback control on the weight of the articles supplied from the feeders 114—114 to the pool hoppers 115—115 based upon these weight signals.

Then, the control unit 120 inputs discharge request signals from a downstream packaging device or the like, and outputs control signals based upon the discharge request signals to gate open/close mechanisms 115b—15b, 116b—16b that opens and closes the gates of the pool hoppers 115—115 or the weighing hoppers 116—116. This discharges articles from the hoppers 115—115, 116—116.

Pool hoppers 115, weighing hoppers 116, weighing detectors 115a and 116a, feeders 114, and gate open/close mechanisms 115b and 116b are conventional components that are well known in the art. Therefore, these structures will not be discussed or illustrated in further detail herein.

Next, an example of the control conducted by the control unit 120 when combination weighing is performed with the combination weighing device 101 will be described with the flowcharts shown in FIGS. 3 to 6.

Figure 3:
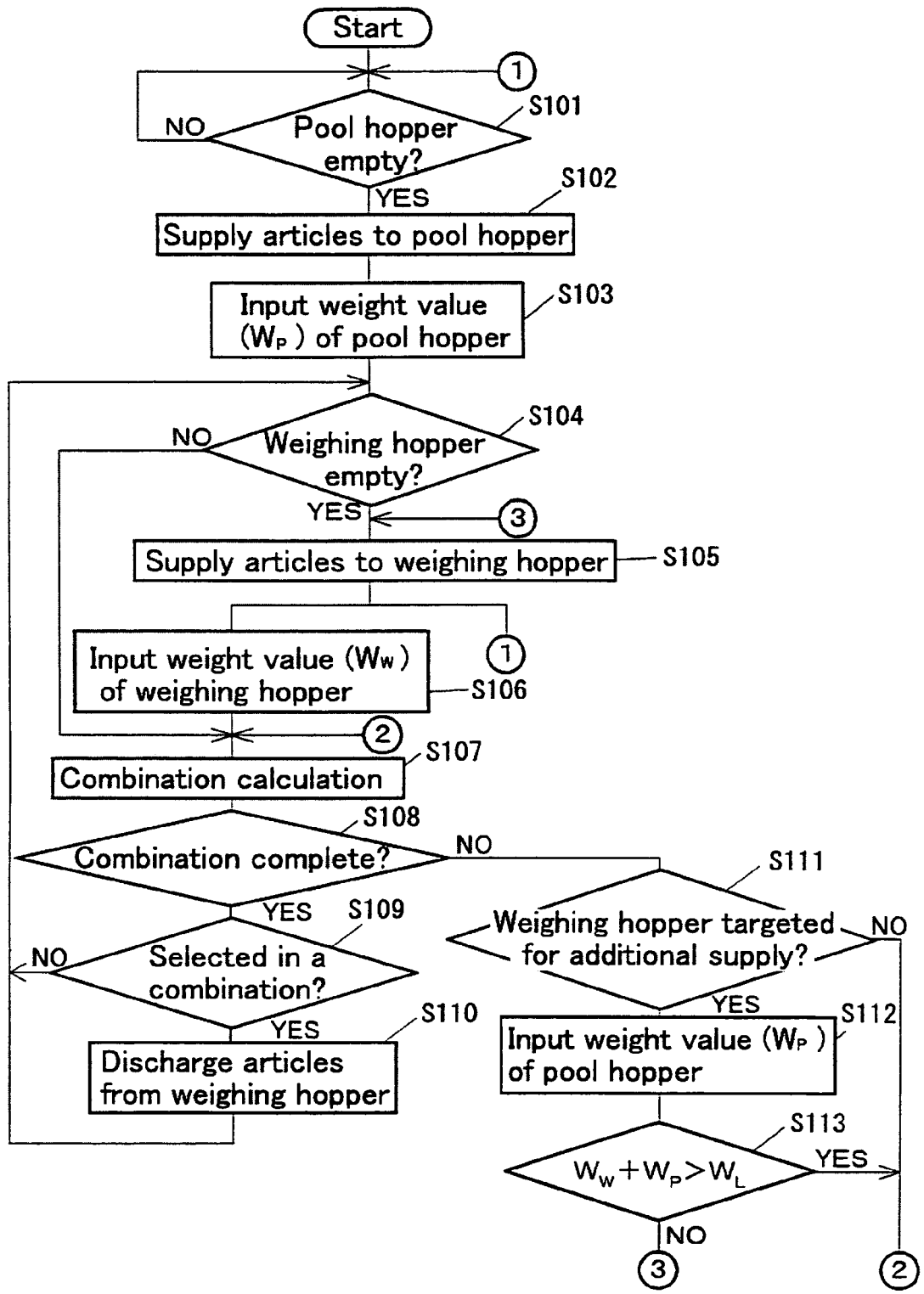
FIG. 3 is a flowchart describing a control in accordance with the first embodiment of the present invention.

FIG. 3 is a flowchart used to determine whether or not it is possible to supply additional articles from the pool hoppers 115—115 to predetermined weighing hoppers 116—116 when the results of a combination calculation indicate that a combination is incomplete. Here, the flowchart will be described by observing a group consisting of one feeder 114, one pool hopper 115, and one weighing hopper 116.

First, in Step S101, if it is determined that the pool hopper 115 is empty, at Step S102, the feeder 114 that corresponds to the pool hopper 115 is driven and a predetermined amount of articles are supplied to the pool hopper 15. If this combination weighing device 101 includes, for example, 10 to 12 weighing hoppers 116—116, then the supply target value of articles to be supplied from the feeders 114—114 to the pool hoppers 115—115 is set such that the combination will be completed with three or four weighing hoppers 116—116.

In Step S103, a weight value $W_P$ is input from the weight detector 115a connected to the pool hopper 15, and in Step S104, if it is determined that the weighing hopper 116 that corresponds to the pool hopper 115 is not empty, the process skips Steps S105, S106 and proceeds to Step S107. On the other hand, if it is determined at Step S104 that the weighing hopper 116 that corresponds to the pool hopper 115 is empty, then at Step S105, the gate open/close mechanism 115b of the pool hopper 15 is driven, and articles are supplied from the pool hopper 15 to the weighing hopper 116.

Then, the combination calculation control or the additional supply control shown in Steps S106 to S113 proceed concurrently with the aforementioned control that begins from Step S101.

In the combination calculation control, after a weight $W_W$ is input from the weight detector 116a connected to the weighing hopper 116 in Step S106, a combination calculation is performed at Step S107. "Performing combination calculation" herein means selecting one or a plurality of hoppers such that the total weight articles in the selected hoppers is closest to the target weight. Note that the weight detector 116a of the weighing hopper 116 confirms the weight $W_P$ provided by the weight detector 115a of the pool hopper 115.

At Step S108, it is determined whether or not the combined weight of the combination is complete with respect to a target weight based upon the results of the combination calculation. "Completing combination calculation" herein means confirming that total weight of articles in the hoppers that are selected by performance of the combination calculation is within a predetermined allowable range from the target value. If it is determined that the combination is complete, then it is determined whether or not the weighing hopper 116 has been selected in this combination at Step S109.

If it is determined that the answer to this is "YES" at Step S109, then the gate open/close mechanism 116b of the weighing hopper 116 is driven at Step S110, and articles from the weighing hopper 116 are discharged to the individual chute 117 below and the process returns to Step S104. If it is determined that the answer is "NO" in Step S109, then the process simply returns to Step S104.

On the other hand, if it is determined in Step S108 that the combination is not within the allowable range, then the process proceeds to additional supply control. In other words, in Step S111, it is determined whether or not the weighing hopper 116 is a previously selected weighing hopper 116 targeted for additional supply. If it is determined that the answer is "NO", then the process simply returns to Step S107, and the weighing hopper 116 will participate in the next combination calculation. Note that if it is determined that the answer is "NO" in Step S111, then another weighing hopper 116 is set as the target for additional supply, and then determined whether or not additional articles can be supplied to that other weighing hopper 116.

Then, if it is determined that the answer is "YES" in Step S111, then at Step S112 the weight value $W_P$ is input from the pool hopper 115 that supplies articles to the weighing hopper 116, and at Step S113 it is determined whether or not the total value (sum) $W_W + W_P$ of the weight $W_W$ from the weighing hopper 116 and the weight $W_P$ from the pool hopper 115 exceeds a predetermined weight limit value $W_L$ of the weighing hopper 116. If the articles are supplied to the weighing hopper 116 beyond this weight limit value $W_L$, an over-scale state will result and the combination weighing device 101 will be compelled to cease operations because of this. Therefore, additional supply will not be allowed in this case.

If it is determined that the answer in Step S113 is "NO", then this means that additional supply is permitted, and thus the process will return to Step S105 and additional articles will be supplied from the pool hopper 115 to the weighing hopper 116. On the other hand, if it is determined that the answer is "YES" in Step S113, then additional articles will not be supplied because it is predicted that an over-scale state will result if additional articles are supplied. Then, the process will return to Step S107, and the weighing hopper 116 will participate in the next combination calculation.

By performing this type of process, when a combination is not complete, the presence or absence of an over-scale state in the weighing hopper 116 can be predicted, and thus additional articles can be supplied from the pool hopper 115 to the weighing hopper 116 without resulting in an over-scale state. Thus, having to cease operations due to an over-scale state can be avoided and operational efficiency can be improved. In addition, if the number of the weighing hoppers 116—116 that are targeted for additional supply are determined in advance, then the likelihood that a combination will be within the allowable range will effectively increase.

Note that it is not only possible to prevent an over-scale state caused by the excessive weight of the articles (as noted above), but it is also possible to prevent an over-scale state caused by supplying a volume of articles that exceeds a maximum allowable capacity of the weighing hopper 116. In other words, the presence or absence of an over-scale state with respect to capacity can be predicted by employing the density of the article and converting the allowable capacity of the weighing hopper 116 to the weight of the allowable capacity, and comparing the total value $W_W + W_P$ with the weight of the allowable capacity.

<Modification A>

Figure 4:
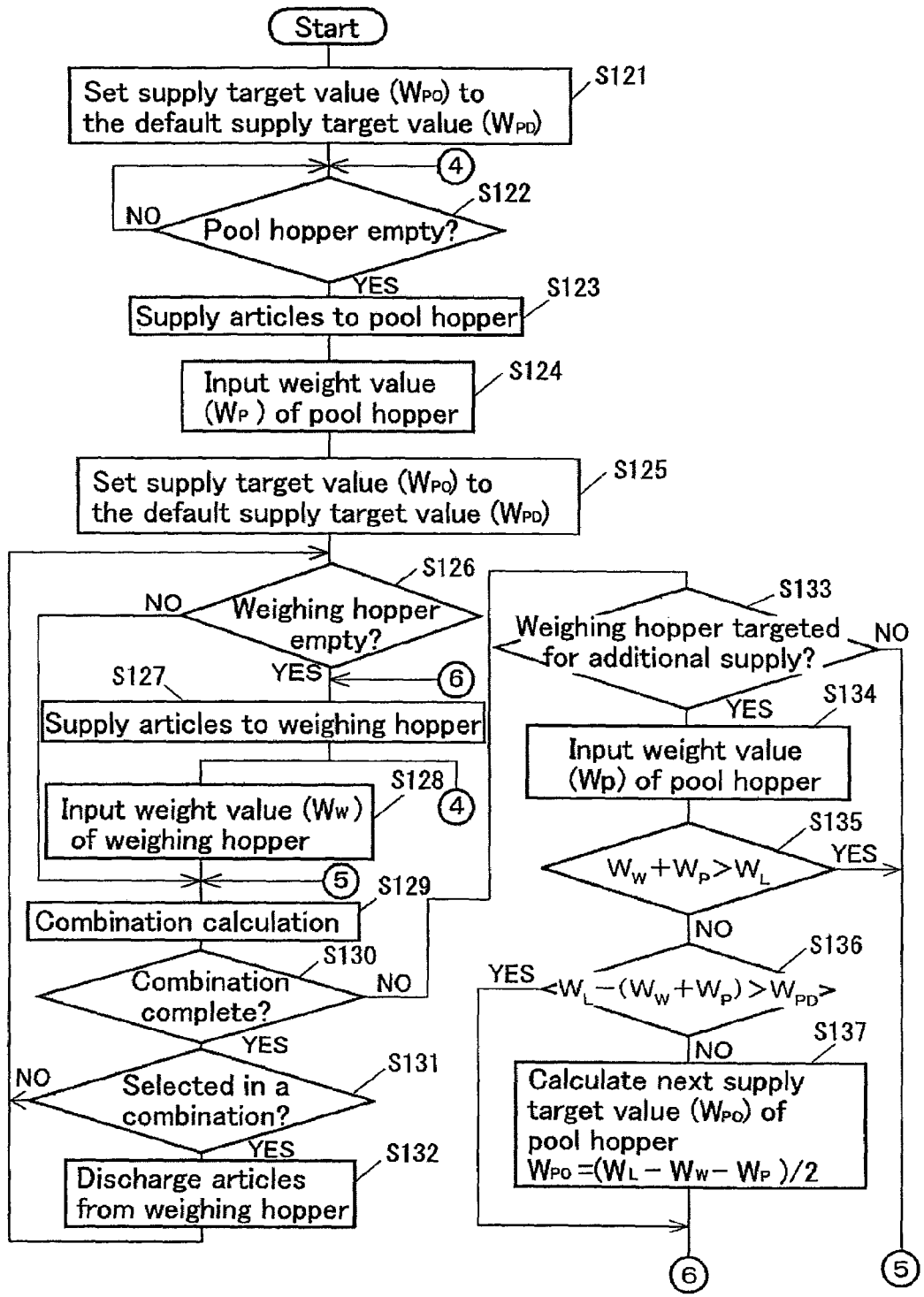
FIG. 4 is a flowchart describing a control in accordance with a modification A of the first embodiment of the present invention.

Next, the flowchart in FIG. 4 will be employed to describe an example of the control used to determine whether or not it is possible to supply additional articles from the pool hoppers 115—115 to predetermined weighing hoppers 116—116 when the results of the combination calculation indicate that the combination is not complete, and the control used to control the quantity of the next articles supplied from the feeders 114—114 to the pool hoppers 115—115. In this situation as well, the flowchart will be described by observing a group of one feeder 114, one pool hopper 15, and one weighing hopper 116.

First, in Step S121, a supply target value $W_{PO}$ of articles to be supplied from the feeder 114 to the pool hopper 115 is set to a default supply target value $W_{PD}$. If this combination weighing device 101 includes, for example, 10 to 12 weighing hoppers 116—116, then the default supply target value $W_{PD}$ is set such that the combination can be accomplished with three or four weighing hoppers 116—116. An example of a default supply target value $W_{PD}$ in this situation is the value obtained by dividing the target weight during a combination calculation by 3.5.

In Step S122, if it is determined that the pool hopper 115 is empty, at Step S123, the feeder 114 that corresponds to the pool hopper 115 is driven and articles are supplied to the pool hopper 115 up to the supply target value $W_{PO}$.

At Step S124, the weight $W_P$ is input from the pool hopper 115, and at Step S125 the supply target value $W_{PO}$ is set to the default supply target value $W_{PD}$.

At Step S126, if it is determined that the weighing hopper 116 that corresponds to the pool hopper 115 is not empty, the process will proceed to Step S129. On the other hand, if it is determined that the weighing hopper 116 that corresponds to the pool hopper 115 is empty, articles are supplied from the pool hopper 115 to the weighing hopper 116 in Step S127, and the combination calculation control and the additional supply control shown in Steps S128 to S137 proceed concurrently with the aforementioned control that begins from Step S122. Note that the combination calculation control shown in Steps S128 to S132 is identical to that of Steps S106 to S100, and thus a description thereof will be omitted.

Then, if it is determined in Step S130 that the combination is not complete, then the process proceeds to additional supply control. In other words, in Step S133, it is determined whether or not the weighing hopper 116 is a previously selected weighing hopper 116 targeted for additional supply. If it is determined that the answer is "NO", then the process simply returns to Step S129, and the weighing hopper 116 will participate in the next combination calculation. Note that if it is determined that the answer is "NO" in Step S133, then another weighing hopper 116 is set as the target for additional supply, and determined that additional supply cannot occur with respect to the original weighing hopper 116.

On the other hand, if it is determined that the answer is "YES" in Step S133, then at Step S134 the weight value $W_P$ is input from the pool hopper 115 that supplies articles to the weighing hopper 116, and at Step S135 it is determined whether or not the total value $W_W+W_P$ of the weight $W_W$ from the weighing hopper 116 and the weight $W_P$ from the pool hopper 115 exceeds the predetermined weight limit value $W_L$ of the weighing hopper 116.

If it is determined that the answer is "NO" in Step S135, then this means that an additional supply is allowed, and thus at Step S136, the total value $W_W+W_P$ is subtracted from the weight limit value $W_L$ and it is determined whether or not the value obtained thereby exceeds the supply target value $W_{PD}$.

If it is determined that the answer is "NO" at Step S136, then at Step S137 the supply target value $W_{PO}$ of the articles to be supplied from the feeder 114 to the pool hopper 115 next time is calculated by the formula in Step S 137 in FIG. 4. Then, the process returns to Step S127, and additional articles are supplied from the pool hopper 115 to the weighing hopper 116. In addition, if the answer in Step S136 is "YES", then the process simply returns to Step S127, and additional articles are supplied from the pool hopper 115 to the weighing hopper 116. Note that in Step S137, the supply target value $W_{PO}$ is calculated by dividing the value obtained when the total value $W_W+W_P$ is subtracted from the weight limit value $W_L$ by, for example, 2, but any value between 1 and 3 can be employed.

Then, if the process continues to Step S127 and then proceeds to Step S122, articles having the supply target value $W_{PO}$ calculated at Step S137 will be supplied from the feeder 114 to the pool hopper 115 at Step S123.

On the other hand, if it is determined that the answer is "YES" in Step S135, then additional articles will not be supplied because it is predicted that an over-scale state will result if additional articles are supplied. Therefore, the process will return to Step S129, and the weighing hopper 116 will participate in the next combination calculation.

By performing the process of step S137, when supplying additional articles is likely to result in the over-scale state, the weight of the articles to be supplied from the feeder 114 to the pool hopper 115 will be made half the value obtained by subtracting the total value $W_W+W_P$ from the weight limit value $W_L$, and thus the avoidance of an over-scale state can be assured when additional articles are supplied to the weighing hopper 116.

<Modification B>

Figure 5:
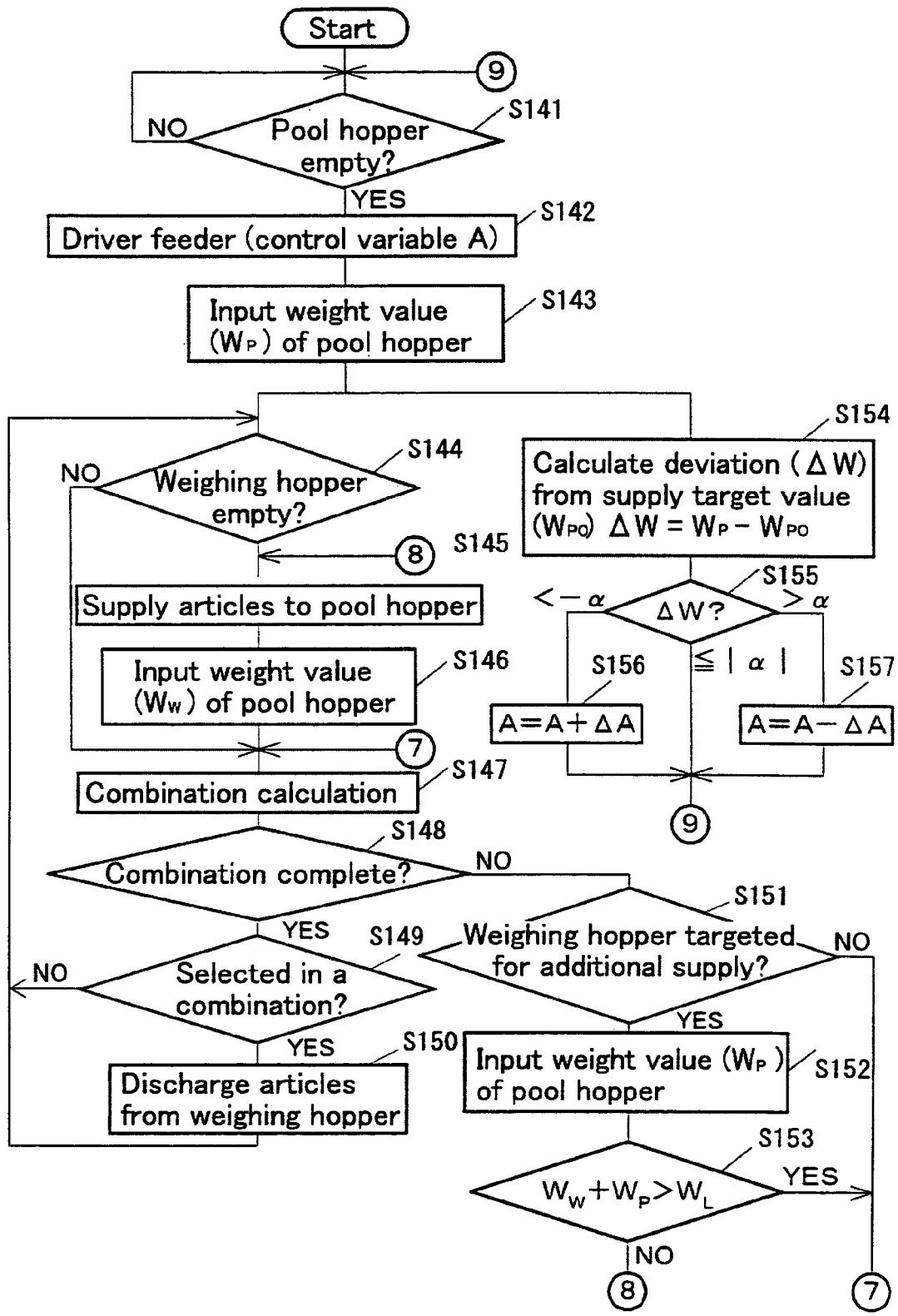
FIG. 5 is a flowchart for describing a control in accordance with a modification B of the first embodiment of the present invention.

Next, with the control example shown in FIG. 3 as a foundation, a control example used to conduct feedback control of articles supplied from the feeder 114 to the pool hopper 115 will be described with reference to the flowchart of FIG. 5.

First, in Step S141, if it is determined that the pool hopper 115 is empty, at Step S142, the feeder 114 that corresponds to the pool hopper 115 is driven and a predetermined amount of articles are supplied to the pool hopper 115. In other words, the supply target value $W_{PO}$ of articles supplied from the feeder 114 to the pool hopper 115 is established in advance, and a control variable A is set during the driving of feeder 114 such that the actual amount of articles supplied is the supply target value $W_{PO}$. The control variable A is composed of at least one of the duration and the amplitude of the vibration applied to the feeder 114.

At Step S143, the weight value $W_P$ from the pool hopper 115 is input, and the combination calculation control and the additional supply control shown in Steps S144 to S153 proceed concurrently with feedback control of the supply of articles from the feeder 114 to the pool hopper 115 shown in Steps S154 to S157. Note that the control shown in Steps S144 to S153 is substantially identical to that of Steps S104 to S113, and thus a description thereof will be omitted.

On the other hand, in the feedback control, the deviation $\Delta W$ between the weight value $W_P$ of articles actually supplied to the pool hopper 115 and the predetermined supply target value $W_{PO}$ of articles to be supplied from the feeder 114 to the pool hopper 115 is calculated in Step S154.

Then, in Step S155, if it is determined that the deviation $\Delta W$ is smaller than a predetermined allowable value $-\alpha$ with respect to the supply target value $W_{PO}$, one unit $\Delta A$ is added to the initial control variable A of the feeder 114 to produce a new control variable A, and then the process returns to Step S141. In addition, in Step S155, if it is determined that the deviation $\Delta W$ is larger than a predetermined allowable value $\alpha$ with respect to the supply target value $W_{PO}$, one unit $\Delta A$ is subtracted from the initial control variable A of the feeder 114 to produce a new control variable A at Step S157, and then the process returns to Step S141. Then, in Step S155, if it is determined that the deviation $\Delta W$ is within a predetermined allowable range of $-\alpha \leq \Delta W \leq \alpha$ with respect to the supply target value $W_{PO}$, the process simply returns to Step S141.

By performing this type of process, additional articles can be supplied from the pool hopper 115 to the weighing hopper 116 so that an over-scale state will not result and the effects noted below can be achieved, even if the combination was not completed.

In other words, with conventional combination weighing devices, when feedback control of the amount of articles supplied by the feeder is conducted based upon the weight from the weighing hopper, articles are supplied from the pool hopper to the weighing hopper and the weight of the articles therein is then measured. Thus, feedback control is performed from this point in time based upon the weight of the articles. In contrast, with the combination weighing device 101, feedback control of the amount of articles supplied to the feeder 114 can be conducted based upon the weight value $W_P$ at the point at which articles are supplied from the feeder 114 to the pool hopper 115. Thus, the time lag from the point at which the weight value $W_P$ is measured to the point at which feedback control is executed will be reduced, and both responsiveness and convergence to the control will be improved. In other words, operating efficiency will improve due to the increase in process speed.

Then, because the amount of articles supplied from the feeder 114 to the pool hopper 115 is managed with good accuracy with respect to the supply target value $W_{PO}$, there will be a high probability that combinations will be complete and thus operational efficiency will improve.

<Modification C>

Figure 6:
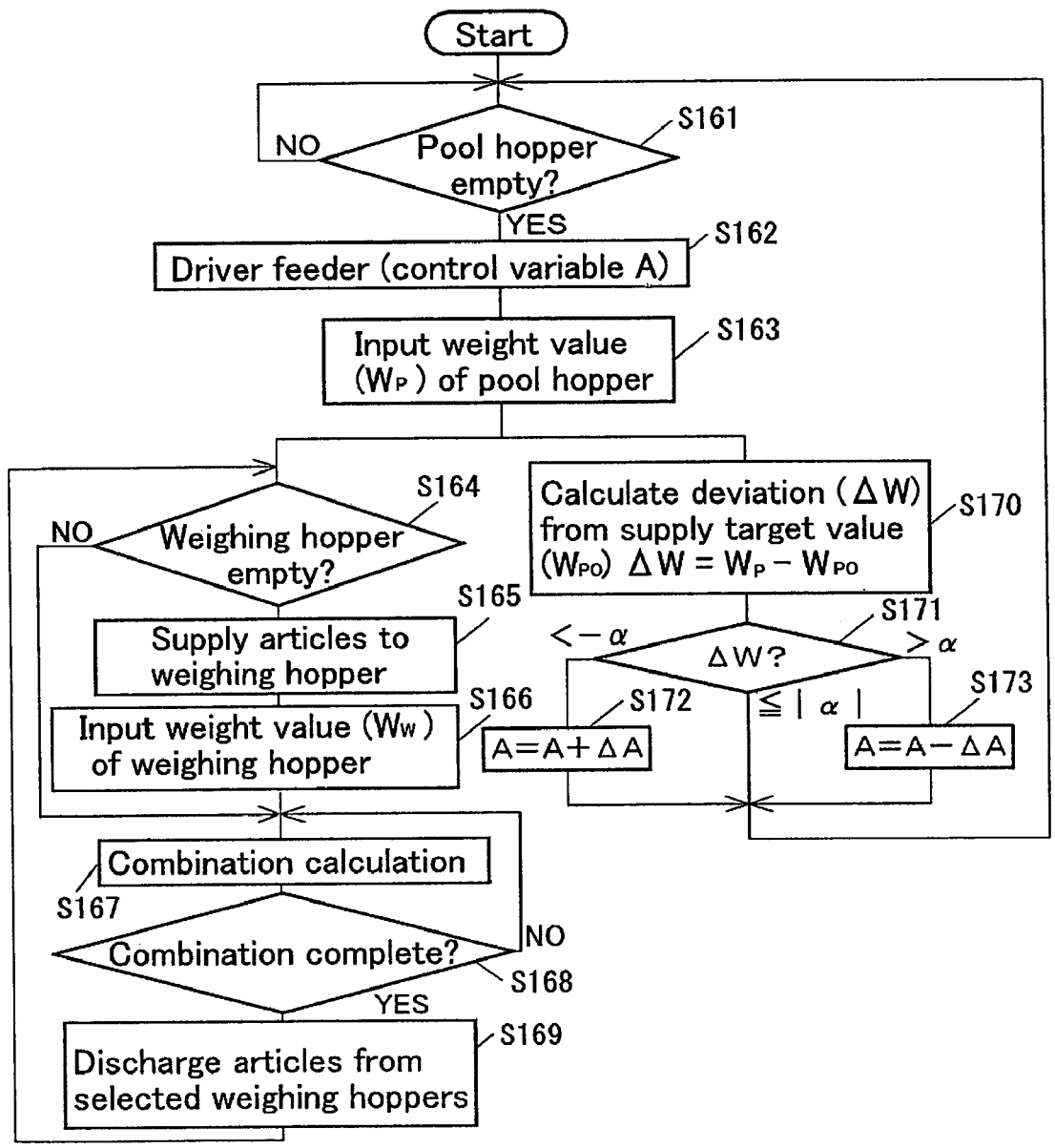
FIG. 6 is a flowchart for describing a control in accordance with a modification C of the first embodiment of the present invention.

Next, a control example used to conduct feedback control of articles supplied from the feeder 114 to the pool hopper 115 based upon the weight value $W_P$ from the pool hopper 115 will be described with reference to the flowchart of FIG. 6. Here, the flowchart will be described by observing all of the feeders 114—114, pool hoppers 115—115, and weighing hoppers 116—116.

First, in Step S161, if it is determined that any of the pool hoppers 115—115 is empty, at Step S162, the feeders 114—114 that corresponds to the empty pool hoppers 115—115 are driven and a predetermined quantity of articles are supplied to the empty pool hoppers 115—115. In other words, a supply target value $W_{PO}$ of articles supplied from the feeders 114—114 to the pool hoppers 115—115 is established in advance, and a control variable A for the feeders 114—114 is established such that the actual amount of articles supplied is the supply target value $W_{PO}$. The control variable A is composed of at least one of the duration and the amplitude of the vibration applied to the feeders 114—114.

At Step S163, the weight values $W_P$-$W_P$ from the pool hoppers 115—115 are input, and the combination calculation control and the additional supply control shown in Steps S164 to S169 proceed concurrently with feedback control of the supply of articles shown in Steps S170 to S173.

In the combination calculation control, if it is determined in Step S164 that any of the weighing hoppers 116—116 is empty, articles are supplied from the pool hoppers 115—115 to the empty weighing hoppers 116—116 at Step S165. Then, after weight values $W_W$-$W_W$ from the weighing hoppers 116—116 are input at Step S166, a combination calculation is performed in Step S167. If it is determined in Step S164 that none of the weighing hoppers 116—116 are empty, then, the process proceeds to step S167.

If it is determined in Step S168 that the combination calculation is complete, articles are discharged from the weighing hoppers 116—116 selected in the combination in Step S169 and then the process returns to Step S164. On the other hand, if it is determined at Step S168 that the combination is not complete, then predetermined steps are performed such as supplying additional articles from the pool hoppers 115—115 to the weighing hoppers 116—116 and the process returns to Step S167.

In the feedback control of steps S170–S173, deviations $\Delta W$-$\Delta W$ between the weight values $W_P$-$W_P$ of articles actually supplied to the pool hoppers 115—115 and the predetermined supply target value $W_{PO}$ of articles to be supplied from the feeders 114—114 to the pool hoppers 115—115 are calculated in Step S170. Then, in Step S171, if it is determined that the deviations $\Delta W$-$\Delta W$ are smaller than a predetermined allowable value $-\alpha$ with respect to the supply target value $W_{PO}$, one unit $\Delta A$ is added to the initial control variable A of the feeders 114—114 to produce a new control variable A in Step S172, and then the process returns to Step S161. In addition, in Step S171, if it is determined that a deviation $\Delta W$ is larger than a predetermined allowable value $\Delta$ with respect to the supply target value $W_{PO}$, one unit $\Delta A$ is subtracted from the initial control variable A of the feeders 114—114 to produce a new control variable A in Step S173, and then the process returns to Step S161. Then, in Step S171, if it is determined that a deviation $\Delta W$ is within a predetermined allowable range of $-\Delta \leq \Delta W \leq \Delta$ a with respect to the supply target value $W_{PO}$, the process simply returns to Step S161.

By performing this type of process, the time lag from the point at which the weight values $W_P$-$W_P$ are measured to the point at which feedback control is executed will be reduced, and both responsiveness and convergence to the control will be improved, because feedback control of the amount of articles supplied to the feeders 114—114 can be performed based upon the weight values $W_P$-$W_P$ at the point at which articles are supplied from the feeders 114—114 to the pool hoppers 115—115. In other words, operating efficiency will improve due to the increase in process speed.

Then, because the amount of articles supplied from the feeders 114—114 to the pool hoppers 115—115 are managed with good accuracy with respect to the supply target value $W_{PO}$, there will be a high probability that combinations will be within an allowable range and thus operational efficiency will improve.

Note that in the aforementioned embodiment, the weights of the articles supplied are first measured by the weight detectors 115a—115a of the pool hoppers 115—115, and then the weights of the articles are confirmed by the weight detectors 116a—116a of the weighing hoppers 116—116. Thus, the weight detectors 115a—115a of the pool hoppers 115—115 may be compared to the weight detectors 116a—116a of the weighing hoppers 116—116 and set to a low weighing accuracy in accordance with need (by for example shortening the weighing times), or the weight detectors may be replaced with those having a lower weighing accuracy. This makes it possible to maintain a predetermined weighing accuracy while reducing costs and increasing the speed of the process.

On the other hand, the weight detectors 116a—116a of the weighing hoppers 116—116 can be omitted by making the weighing accuracy of the weight detectors 115a—115a of the pool hoppers 115—115 the same as that presently required with the weight detectors 116a—116a of the weighing hoppers 116—116. In this situation, both the articles and the weights $W_P$-$W_P$ of the articles will be sent from the pool hoppers 115—115 to the weighing hoppers 116—116. This allows the weighing operation by the weighing hoppers 116—116 to be omitted, and thus the burden on the control unit 120 can be reduced and a predetermined weighing accuracy can be maintained while reducing costs and increasing the speed of the process.

In addition, the feeders 114—114, the pool hoppers 115—115, and the weighing hoppers 116—116 of the combination weighing device 101 according to the aforementioned embodiment are arranged in a circular shape when viewed from above, but the effects of the present invention described above will be obtained even if the combination weighing device 101 is arranged in a linear shape.

Then, articles from the pool hoppers 115—115 may be discharged in both the direction of the weighing hoppers 116—116 and the direction of the individual chutes 117—117. In addition, booster hoppers may be arranged below the corresponding weighing hoppers 116—116, and articles from the weighing hoppers 116—116 may be discharged both in the direction of the booster hoppers and the direction of the individual chutes 117—117. This allows the number of weights participating in a combination calculation to be reliably increased, and thus the combinations will fall within an allowable range with a high probability.

SECOND EMBODIMENT

A combination weighing device according to a second embodiment of the present invention will be described below.

Figure 7:
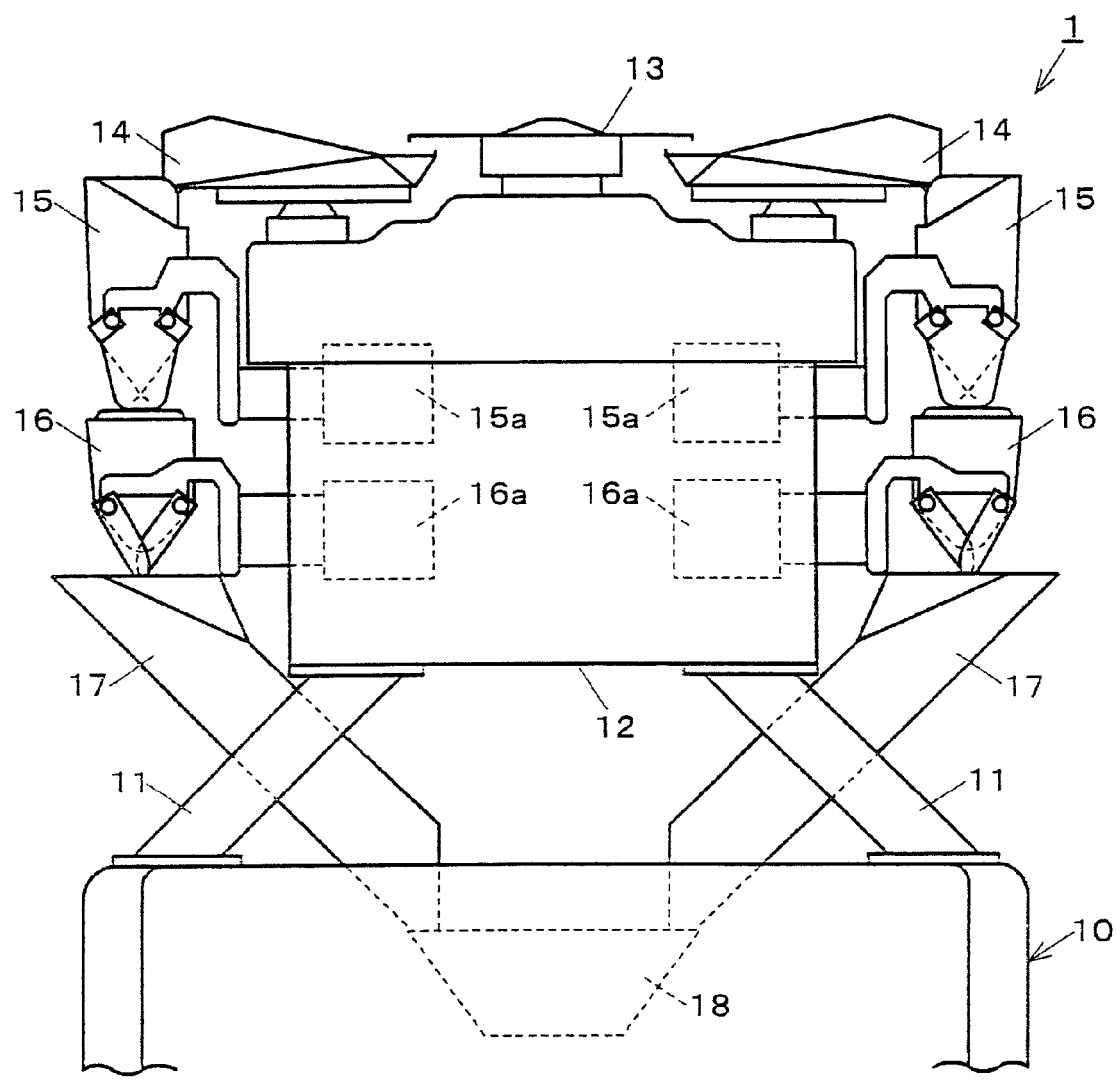
FIG. 7 is a lateral view illustrating the essential elements of a combination weighing device in accordance with a second embodiment of the present invention.

As shown in FIG. 7, a combination weighing device 1 includes a box shaped main case 12 that is supported by a plurality of support legs 11—11 on top of a frame 10. A dispersion table 13 that disperses articles such as snack foods and candy, a plurality of feeders 14—14 that are disposed in a radiating pattern around the periphery of the dispersion table 13, pool hoppers 15—15 that are vertically paired with each of the feeders 14—14, and weighing hoppers 16—16 are attached to the main case 12. Weight detectors 15a—15a, 16a—16a that are composed of load cells or the like are each connected to the pool hoppers 15—15 and the weighing hoppers 16—16. The weights of articles supplied by the pool hoppers 15—15 and the weighing hoppers 16—16 are measured by the weight detectors 15a—15a, 16a—16a.

The articles supplied to the combination weighting device 1 by means of a supply device (not shown in the figures) are first approximately uniformly dispersed to the feeders 14—14 by vibrating the dispersion table 13, and then supplied from the vibrating feeders 14—14 to the weighing hoppers 16—16 in suitable quantities via the pool hoppers 15—15. Then, each of the weights is measured with the weighing hoppers 16—16 and a combination calculation is performed.

Individual chutes 17—17 are disposed below each weighing hopper 16—16. Based on the results of the combination calculation, articles are discharged from the weighing hoppers 16—16 that have been selected for the combination to the individual chutes 17—17. The articles discharged and dropped into the individual chutes 17—17 are collected by means of a funnel shaped collection chute 18 disposed in the approximate center of the combination weighing device 1, and the articles are then supplied to a packaging device or the like that is on the downstream side of the collection chute 18.

Figure 8:
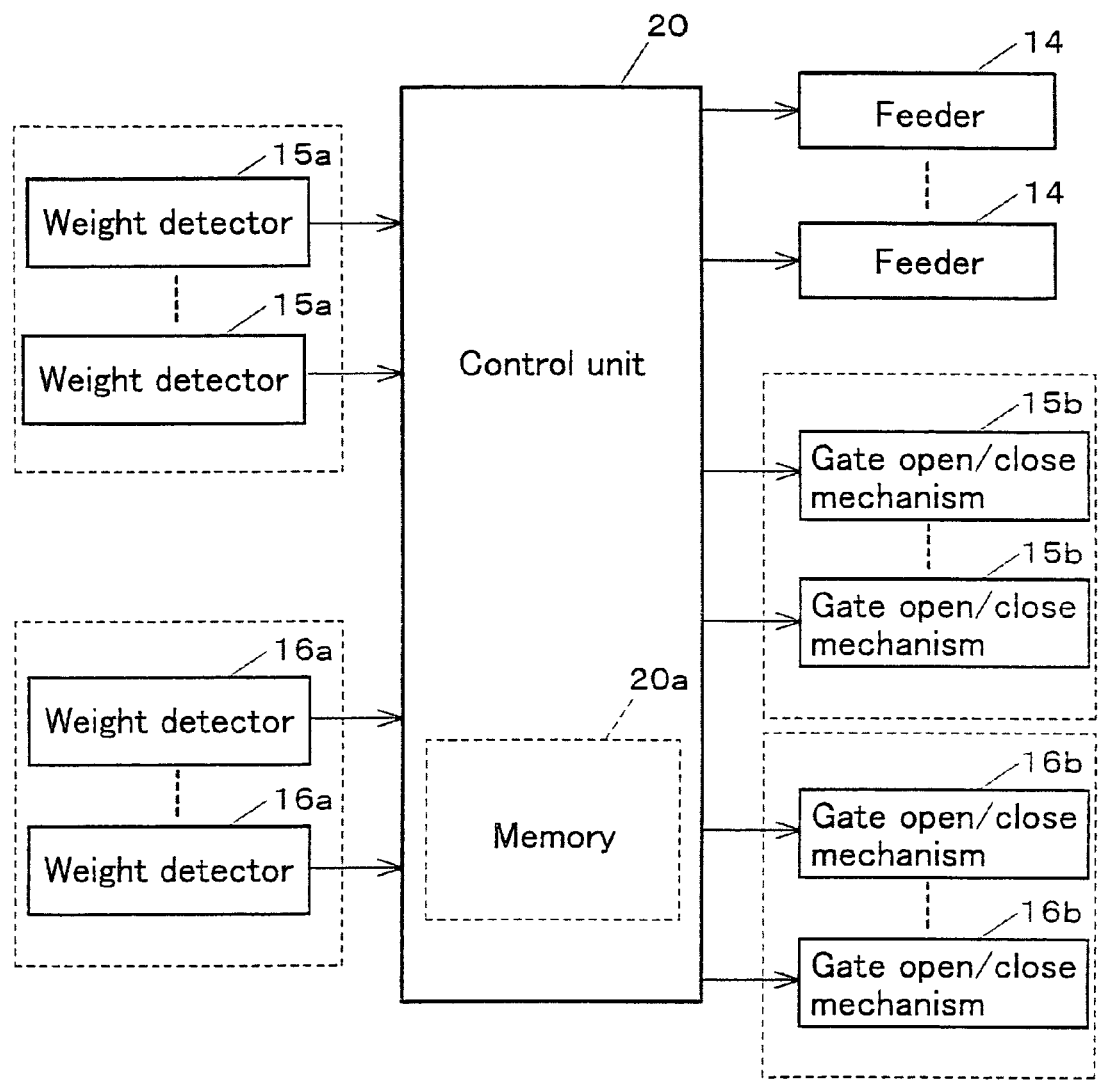
FIG. 8 is a block diagram of a control system in accordance with a second embodiment of the present invention.

As shown in FIG. 8, a control system for the combination weighing device 1 includes a control unit 20 that comprehensively controls the combination weighing device 1.

The control unit 20 preferably includes a microcomputer with a control program that controls the combination weighing device 1 as discussed below. The control unit 20 can also include other conventional components such as an input interface circuit, an output interface circuit, and storage devices such as a ROM (Read Only Memory) device and a RAM (Random Access Memory) device. The control unit 20 is operatively coupled to the weight detectors 15a and 16a, the feeders 14, and the gate open/close mechanisms 15b and 16b in a conventional manner as shown in FIG. 8. The control unit 20 is capable of selectively controlling any of the components of the combination weighing device 1 in accordance with the control program. It will be apparent to those skilled in the art from this disclosure that the precise structure and algorithms for control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control unit 20 inputs weight signals from the weight detectors 16a—16a provided in each weighing hopper 16—16, performs a combination calculation based on these weight signals, and selects a combination in which the combined weight of the articles is within an allowable range with respect to a target weight.

In addition, the control unit 20 calculates a plurality of combinations by means of the combination calculation in which the combination weights are within an allowable range with respect to the target weight. Memory 20a of the control unit 20 stores these combinations in an ideal sequence, i.e., ordered according to the degree of accuracy with respect to the target weight.

In addition, the control unit 20 performs a secondary combination calculation involving the weights of the weighing hoppers 16—16 selected in the combinations and the weights of pool hoppers 15—15 that store the articles for the selected weighing hoppers 16—16, and selects a secondary combination in which the combination weight is within an allowable range with respect to the target weight.

In addition, the control unit 20 supplies additional articles from a pool hopper 15 to a weighing hopper 16 when the combination is not within the allowable range. Then, the control unit 20 inputs a weight signal from a weight detector 15a of the pool hopper 15 when additional articles are to be added, and controls the amount of articles supplied from a feeder 14 to the pool hopper 15 based upon this weight signal and a weight signal from the weight detector 16a of the weighing hopper 16.

In addition, the control unit 20 supplies additional articles from the pool hopper 15 to the weighing hopper 16 when the combination is not complete. Then, when additional articles are to be supplied, the control unit 20 selects the pool hopper 15 that will complete the combination by supplying stored articles to the weighing hopper 16.

Then, the control unit 20 inputs discharge request signals from a downstream packaging device or the like, and outputs control signals based upon the discharge request signals to gate open/close mechanisms 15b—15b, 16b—16b that open and close the gates of the pool hoppers 15—15 or the weighing hoppers 16—16. This discharges articles from the hoppers 15—15, 16—16.

Pool hoppers 15, weighing hoppers 16, weighing detectors 15a and 16a, feeders 14, and gate open/close mechanisms 15b and 16b are conventional components that are well known in the art. Therefore, these structures will not be discussed or illustrated in further detail herein.

Next, an example of the control steps executed by the control unit 20 when performing combination weighing with the combination weighing device 1 will be described below.

Figure 12A:
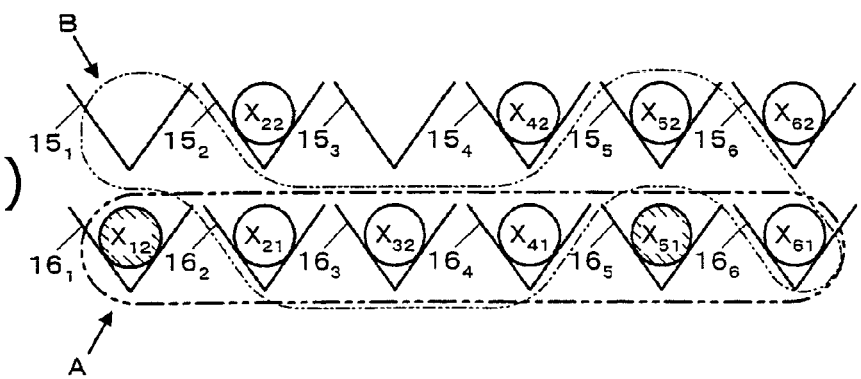
FIG. 12($a$) is schematic diagram for describing an article supply/discharge operation in accordance with the second embodiment of the present invention.

First, when the results of the secondary combination calculation indicate that a secondary combination is not complete, the control unit 20 will control a feeder 14 to supply articles to an empty pool hopper 15 so that the secondary combination will be within the allowable range. This control is described in FIGS. 9–13. Note that subscripts are attached to each of the pool hoppers 15—15, weighing hoppers 16—16, and articles X—X shown in FIGS. 11–13 and are employed in the description provided below, in order to more clearly explain the supply and discharge of the articles X—X.

Figure 9:
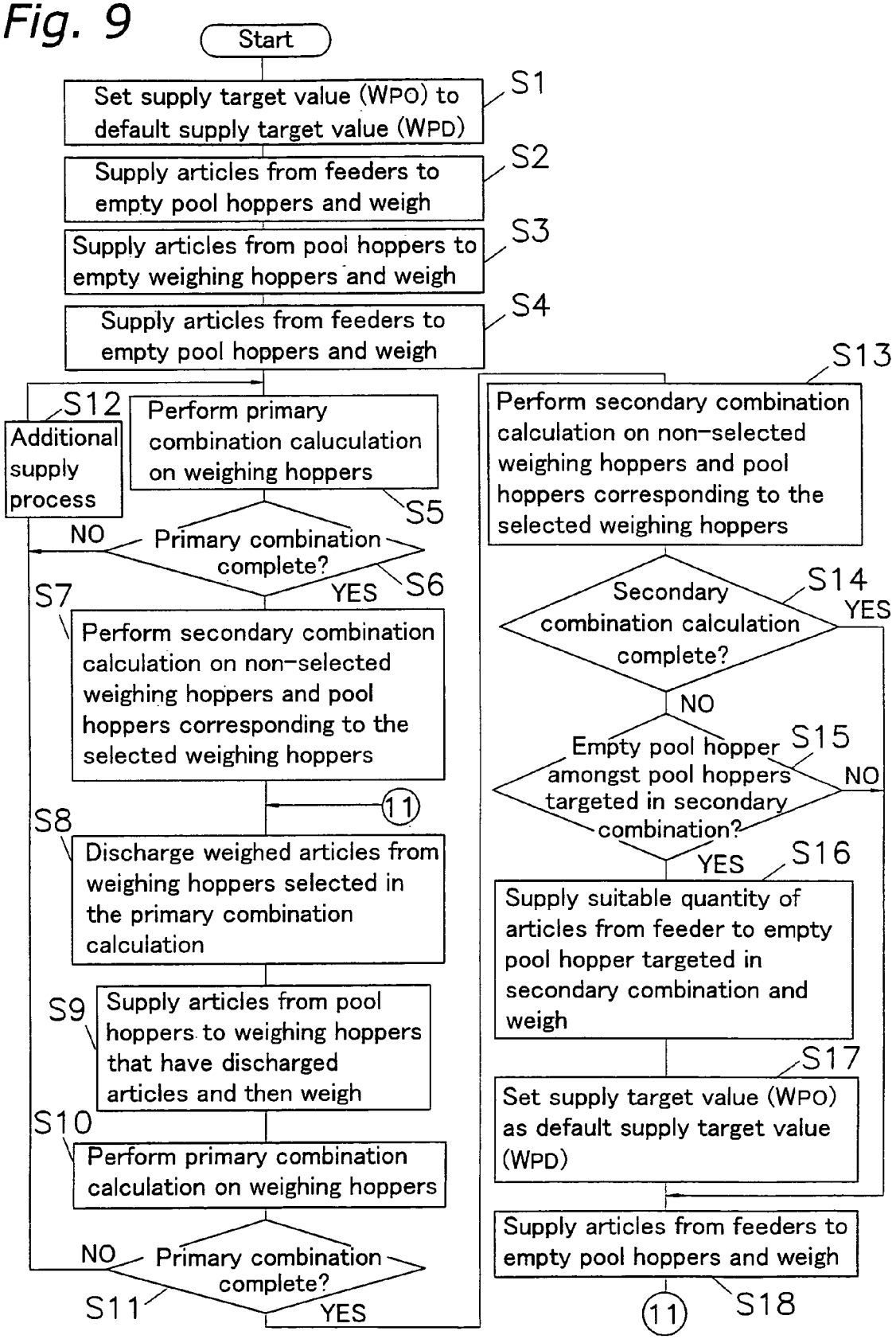
FIG. 9 is a flowchart for describing a control in accordance with the second embodiment of the present invention.

As shown in FIG. 9, when the combination weighing device 1 begins operating, the supply target value $W_{PO}$ of articles X—X supplied from the feeders 14—14 to the pool hoppers 15—15 is set to a default supply target value $W_{PD}$ in Step S1. If this combination weighing device 1 includes, for example, 6 weighing hoppers 16—16, then the default supply target value $W_{PD}$ of articles supplied from the feeders 14—14 to the pool hoppers 15—15 is set such that the combination can be accomplished within the allowable range with 2 to 3 weighing hoppers 16—16. In other words, an example of the default supply target value $W_{PD}$ in this situation is the value obtained by dividing the target weight during a combination calculation by 2.5.

In Step S2, after the feeders 14—14 are driven and articles X—X are supplied to empty pool hoppers 15—15 so that the predetermined supply target value $W_{PO}$ is reached, the weight values of the articles X—X are input from the weight detectors 15*a*—15*a* connected to the pool hoppers 15—15. Here, because this is immediately after the combination weighing device 1 began operation, pool hoppers $15_1$–$15_6$ are all empty at first, and then articles $X_{11}$–$X_{61}$ are supplied to and respectively stored in the pool hoppers $15_1$–$15_6$ (see FIG. 11(*a*)).

At Step S3, after the gate open/close mechanisms 15*b*—15*b* of the pool hoppers 15—15 are driven and the articles X—X are supplied from the pool hoppers 15—15 to the weighing hoppers 16—16, the weight values of the articles X—X are input from the weight detectors 16*a*—16*a* connected to the weighing hoppers 16—16. Note that in this situation, the weight detectors 16*a*—16*a* connected to the weighing hoppers 16—16 will confirm the weight values from the pool hoppers 15—15. In addition, because this is immediately after the combination weighing device 1 began operation, weighing hoppers $16_1$–$16_6$ are all empty at first, and then the articles $X_{11}$–$X_{61}$ are respectively supplied to and stored in the weighing hoppers $16_1$–$16_6$ (see FIGS. 11(*a*), 11(*b*)).

Then at Step S4, after new articles X—X are supplied from the feeders 14—14 to the empty pool hoppers 15—15, the weight values of these articles X—X are input. Articles $X_{12}$–$X_{62}$ supplied this time are respectively stored in the pool hoppers $15_1$–$15_6$ (see FIG. 11(*b*)).

At Step S5, a primary combination calculation is performed on the weighing hoppers 16—16, and at Step S6, it is determined whether or not the combination weight of the primary combination is complete with respect to the target weight based upon the results of the primary combination calculation. The target group of the primary combination calculation is shown in FIG. 11(*c*) encircled with a thick dotted line and labeled "A". Here, the primary combination is accomplished with two weighing hoppers $16_1$, $16_3$, i.e., articles $X_{11}$, $X_{31}$.

At Step S6, the process determines whether the primary combination is complete. If the answer is "YES" in Step S6, then a secondary combination calculation is performed at Step S7 on the weighing hoppers 16—16 not selected in the primary combination and the pool hoppers 15—15 corresponding to the selected weighing hoppers 16—16. The target group of the secondary combination calculation is shown in FIG. 11(*c*) encircled with a thin dotted line and labeled "B". Here, a complete secondary combination is one weighing hopper $16_5$, i.e., article $X_{51}$, and one pool hopper $15_1$, i.e., article $X_{12}$. At Step S8, the gate open/close mechanisms 16*b*, 16*b* of the weighing hoppers $16_1$, $16_3$ selected in the primary combination calculation are driven to discharge the articles $X_{11}$, $X_{31}$ from the weighing hoppers $16_1$, $16_3$ to the individual chutes 17, 17. At Step S9, after articles $X_{12}$, $X_{32}$ are supplied from the pool hoppers $15_1$, $15_3$, which correspond to the weighing hoppers $16_1$, $16_3$ that discharged the articles $X_{11}$, $X_{31}$, the weight values of these articles $X_{12}$, $X_{32}$ are input (See FIG. 11(*d*)).

At Step S10, a primary combination calculation is performed on the weighing hoppers 16—16, and at Step S11, it is determined whether or not the combination weight of the primary combination is in an allowable range with respect to the target weight based upon the results of the primary combination calculation. The target group of the primary combination calculation is shown in FIG. 12(*a*) encircled with a thick dotted line and labeled "A". Here, as shown above with the results of the secondary combination calculation in Step S7, a complete primary combination is the two weighing hoppers $16_1$, $16_5$, i.e., articles $X_{12}$, $X_{51}$.

Then, the process will proceed to Step S12 if it is determined that the answer is "NO" in Step S6 or Step S11, and after additional articles X are supplied from the pool hoppers 15 corresponding to predetermined weighing hoppers 16, the process will return to Step S5.

If the answer is "YES" in Step S11, then a secondary combination calculation is performed at Step S13 on the weighing hoppers 16—16 not selected in the primary combination and the pool hoppers 15—15 corresponding to the selected weighing hoppers 16—16. The target group of the secondary combination calculation is shown in FIG. 12(*a*) encircled with a thin dotted line and labeled "B", and includes the empty pool hopper $15_1$. Note that the secondary combination is not complete at this point.

At Step S14, it is determined whether or not the secondary combination has a combination weight that is within the allowable range with respect to the target weight based on the results of the secondary combination calculation. Then in Step S14, if for example it is determined that the answer for the illustration shown in FIG. 12(*a*) is "NO", then in Step S15 it is determined whether or not there is an empty pool hopper in the target pool hoppers 15—15 of the secondary combination calculation in Step S13. As can be clearly seen in FIG. 12(*a*), the pool hopper $15_1$ satisfies this requirement.

If the answer is determined to be "YES" in Step S15, then in Step S16 after a suitable quantity of articles X are supplied from a feeder 14 to the empty target pool hopper 15 of the secondary combination calculation, the weight value of these articles X is input. Here, the term "suitable quantity" means a quantity that will complete a primary combination in the next primary combination calculation. In FIG. 12(*b*), a suitable quantity of articles $X_{13}'$ is supplied to the pool hopper $15_1$.

Figure 10:
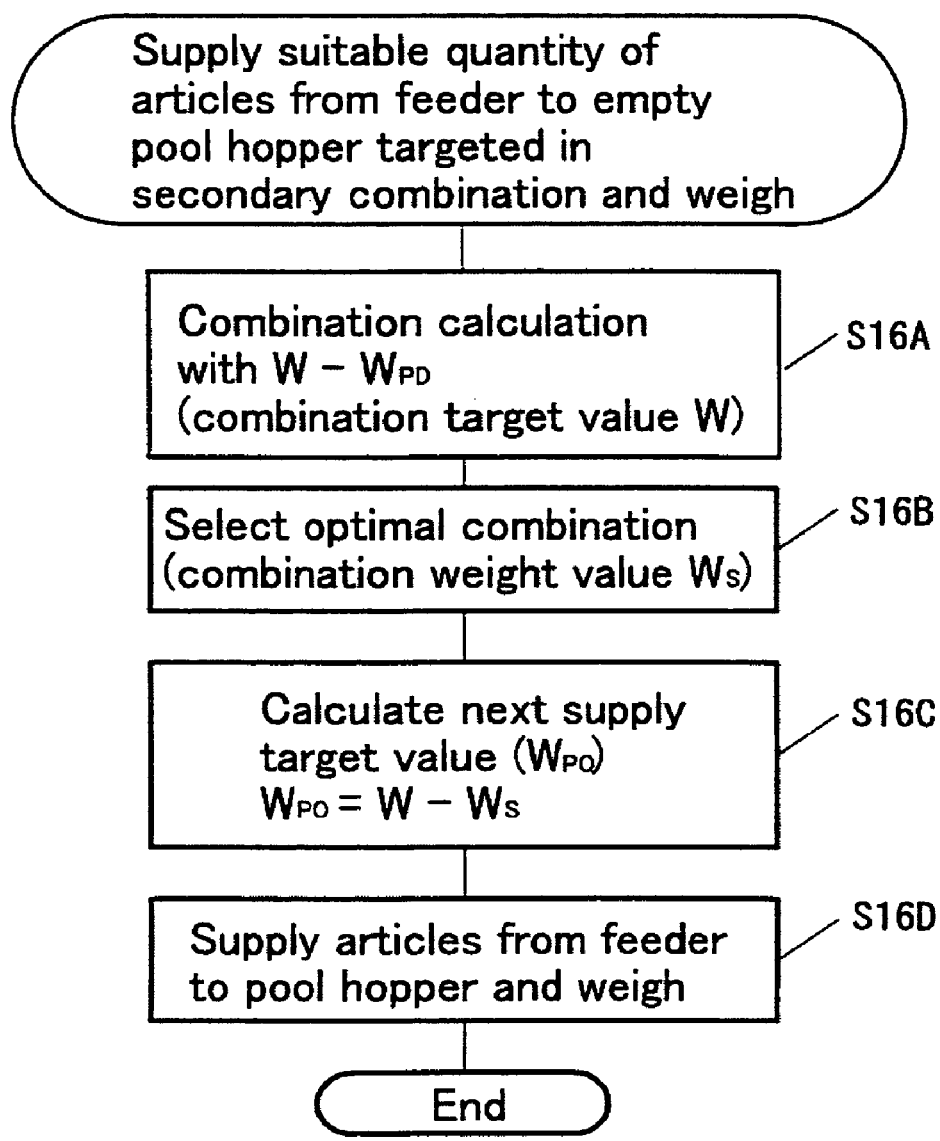
FIG. 10 is a flowchart that illustrates the details of Step S16 in FIG. 9.
Figure 11A:
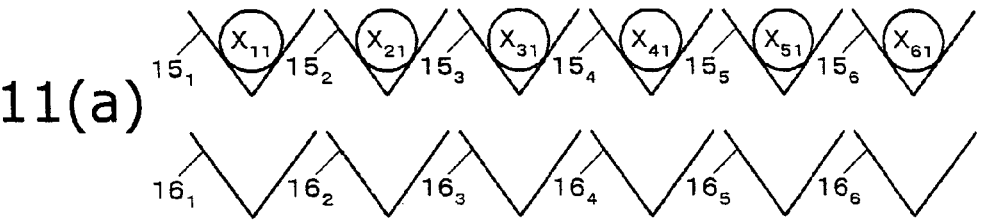
FIG. 11($a$) is schematic diagram for describing an article supply/discharge operation in accordance with the second embodiment of the present invention.
Figure 11B:
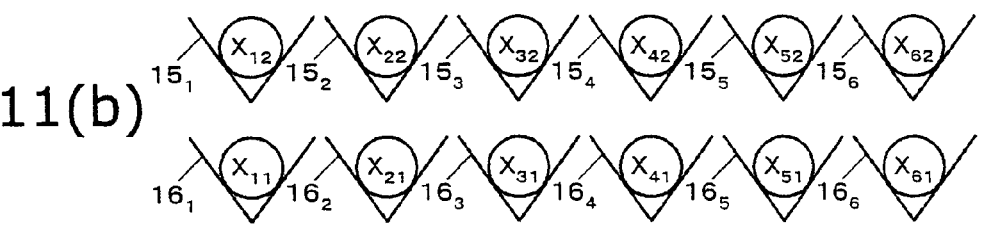
Figure 11C:
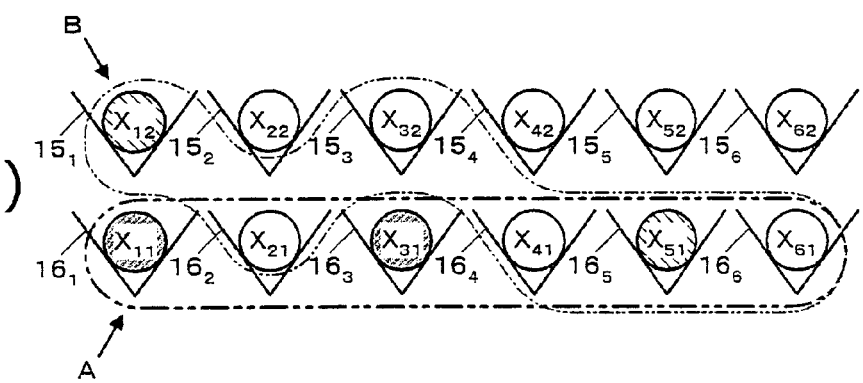
Figure 11D:
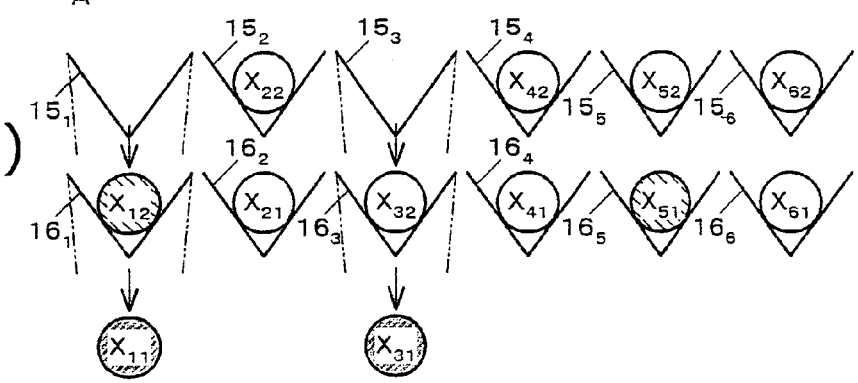

Step S16 will be described here in detail. As shown in FIG. 10, in Step S16A, a combination calculation on the group encircled with the thin dotted line and labeled "B" in FIG. 12(*a*) is performed with a value $W-W_{PD}$ (a target weight) obtained by subtracting the default supply target value $W_{PD}$ from the combination target value W. In Step S16B, an optimal combination is selected. A combination weight value $W_s$ is obtained by means of this optimal combination.

Figure 12B:
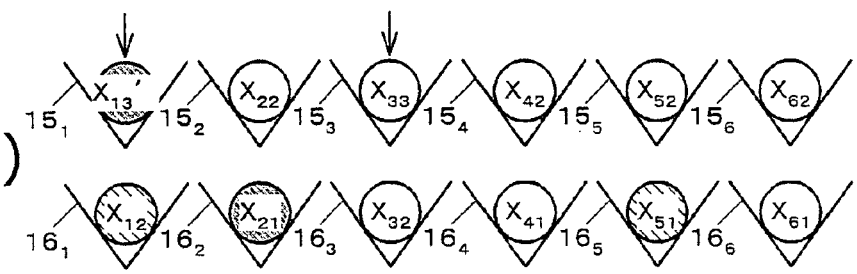
Figure 12C:
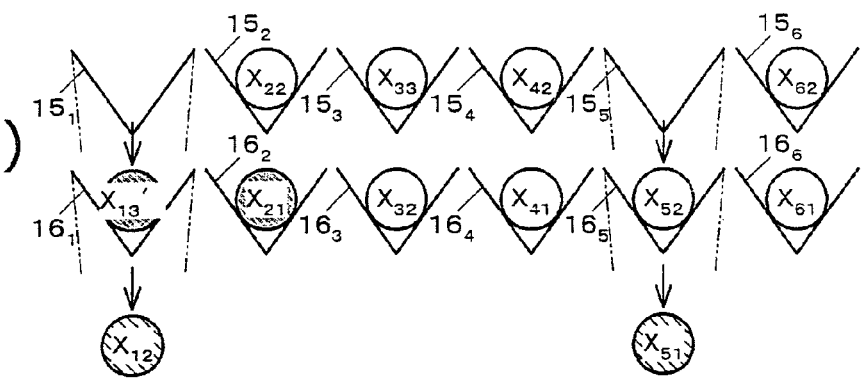

At Step S16C, the supply target value $W_{PO}$ of the next article $X_{13}$' to be supplied to the pool hopper $15_1$ is set to a value $W-W_s$ obtained by subtracting the combination weight value $W_s$ of the combination selected in Step S16B from the combination target value W. Then in Step S16D, after the article $X_{13}$' is supplied from a feeder 14 to the pool hopper $15_1$, the weight value of the article $X_{13}$' is input. The result of this, as shown in the example in FIG. 12(b), is that the next primary combination will be complete with the article $X_{13}$' and an article $X_{21}$ stored in the weighing hopper $16_2$.

In other words, after the optimal quantity of the article X stored in the empty target pool hopper 15 of the secondary combination calculation determined in Step S15 is stored in the weighing hopper 16 that will be emptied in Steps S8, S9, it will then be selected by means of the primary combination calculation of Step S10. Note that in situations in which there is a plurality of empty pool hoppers 15—15, one pool hopper 15 may be set in advance to supply the optimal quantity of article X.

Returning now to FIG. 9, the supply target value $W_{PO}$ of the articles X—X supplied from the feeders 14—14 to the pool hoppers 15—15 is set as the default supply target value $W_{PD}$ in Step S17. Then at Step S18, after a normal amount of articles X—X are supplied from the feeders 14—14 to the empty pool hoppers 15—15 other than the pool hopper $15_1$, the weight values of these articles X—X are input. In FIG. 12(b), this step is performed by supplying an article $X_{33}$ to the pool hopper $15_3$.

Next, the process returns to Step S8, and articles $X_{12}$, $X_{51}$ are discharged from the weighing hoppers $16_1$, $16_5$ selected in the previous primary combination calculation. At Step S9, after articles $X_{13}$', $X_{52}$ are supplied from the pool hoppers $15_1$, $15_5$ corresponding to the weighing hoppers $16_1$, $16_5$ that discharged the articles $X_{12}$, $X_{51}$, the weight values of these articles $X_{13}$', $X_{52}$ are input. As noted above, in the next primary combination calculation, the primary combination will be complete with the two weighing hoppers $16_1$, $16_2$, i.e., articles $X_{13}$', $X_{21}$ (see FIG. 12(c)).

Figure 13A:
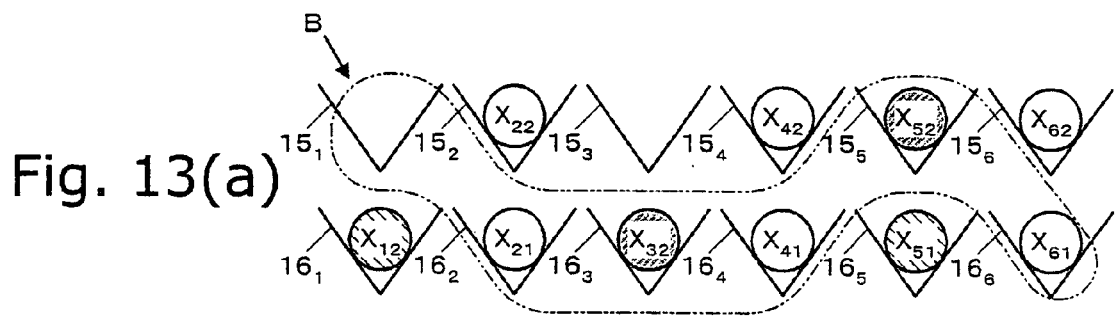
FIG. 13($a$) is schematic diagram for describing an article supply/discharge operation in accordance with the second embodiment of the present invention.
Figure 13B:
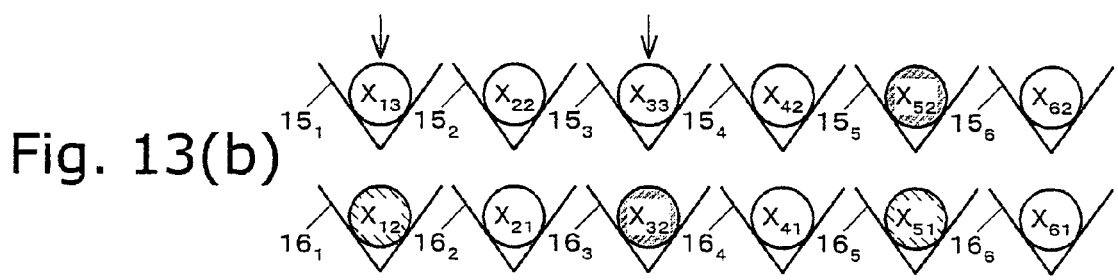
Figure 13C:
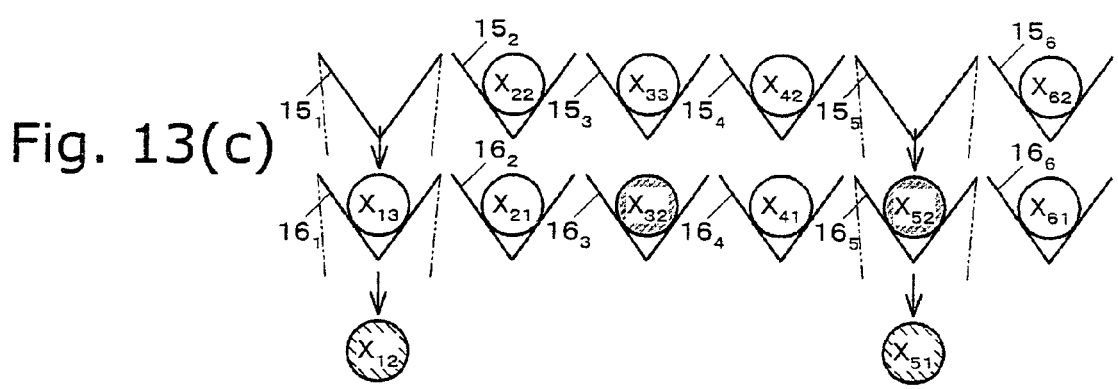

On the other hand, if it is determined that the answer is "YES" in Step S14, the process proceeds to Step S18, and after a normal quantity of articles X—X are supplied from the feeders 14—14 to the empty pool hoppers 15—15, the weight values of these articles X—X are input. The target group of the secondary combination calculation is shown in FIG. 13(a) encircled with a thin dotted line and labeled "B". Here, a complete secondary combination is one weighing hopper $16_3$, i.e., article $X_{32}$, and one pool hopper $15_5$ (i.e., article $X_{52}$). In addition, in FIG. 13(b), articles $X_{13}$, $X_{33}$ are respectively supplied to the two empty pool hoppers $15_1$, $15_3$.

Then, after the process proceeds to Step S18, the process will return to Step S8 and Step S9. In other words, articles $X_{12}$, $X_{51}$ are discharged from the weighing hoppers $16_1$, $16_5$, and after articles $X_{13}$, $X_{52}$ are supplied from the pool hoppers articles $15_1$, $15_5$ corresponding to the weighing hoppers $16_1$, $16_5$ that discharged the articles $X_{12}$, $X_{51}$, the weight values of these articles $X_{13}$, $X_{52}$ are input (See FIG. 13(c)).

In addition, if it is determined that the answer is "NO" in Step S15, the process proceeds to Step S18 and control will continue to be executed.

By performing this type of process, whether or not a primary combination in the next primary combination calculation will be complete can be predicted by performing a secondary combination calculation based upon the results of the primary combination calculation. In other words, when it is predicted in a secondary combination calculation that a secondary combination will not be complete, a suitable quantity of an article X will be supplied from a feeder 14 to a pool hopper 15 that is determined to be empty so that the secondary combination will be complete, and thus in the next primary combination calculation the primary combination will be complete and operational efficiency will be reliably increased.

<Modification D>

Figure 14:
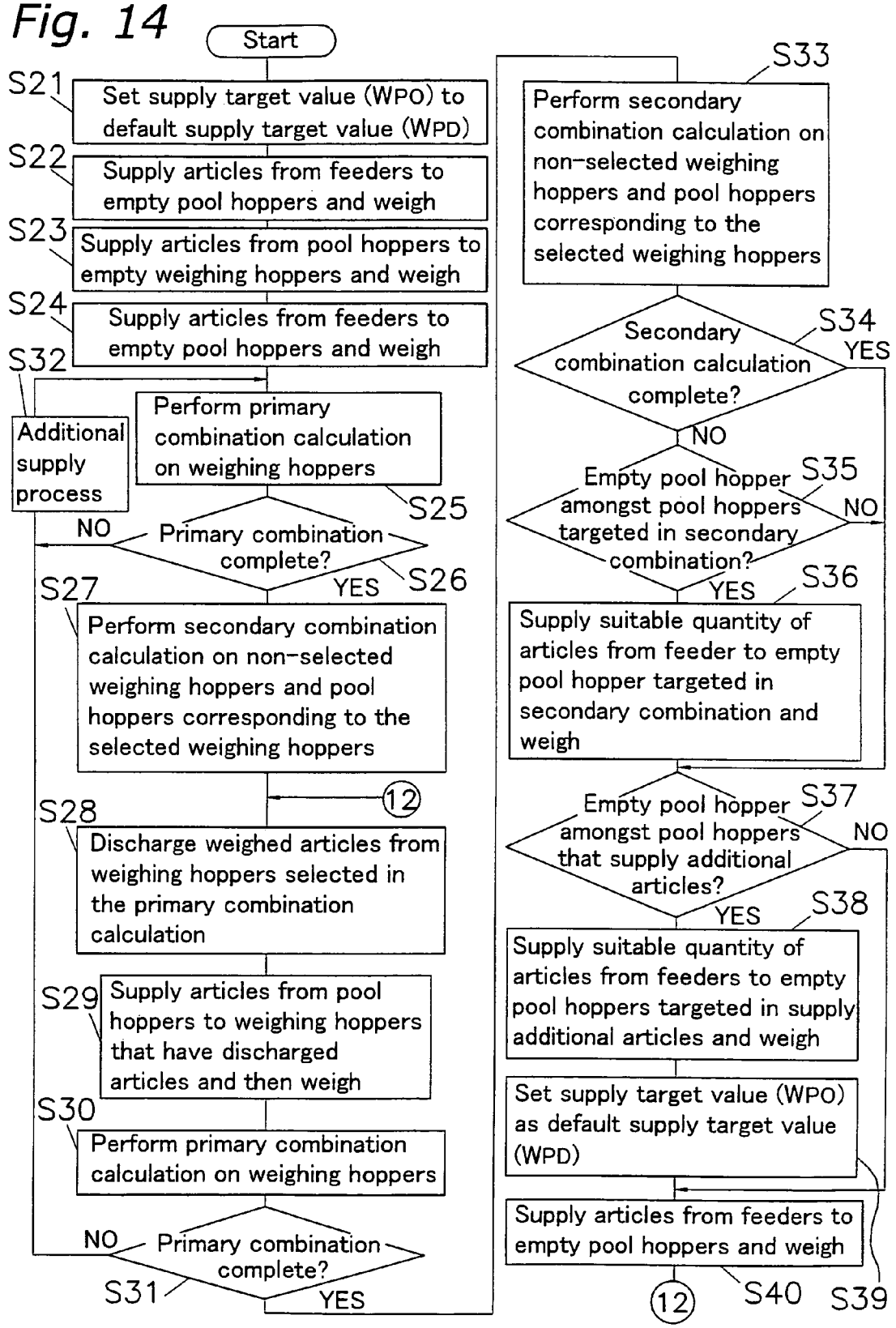
FIG. 14 is a flowchart for describing another control in accordance with a modification D of the second embodiment of the present invention.
Figure 15:
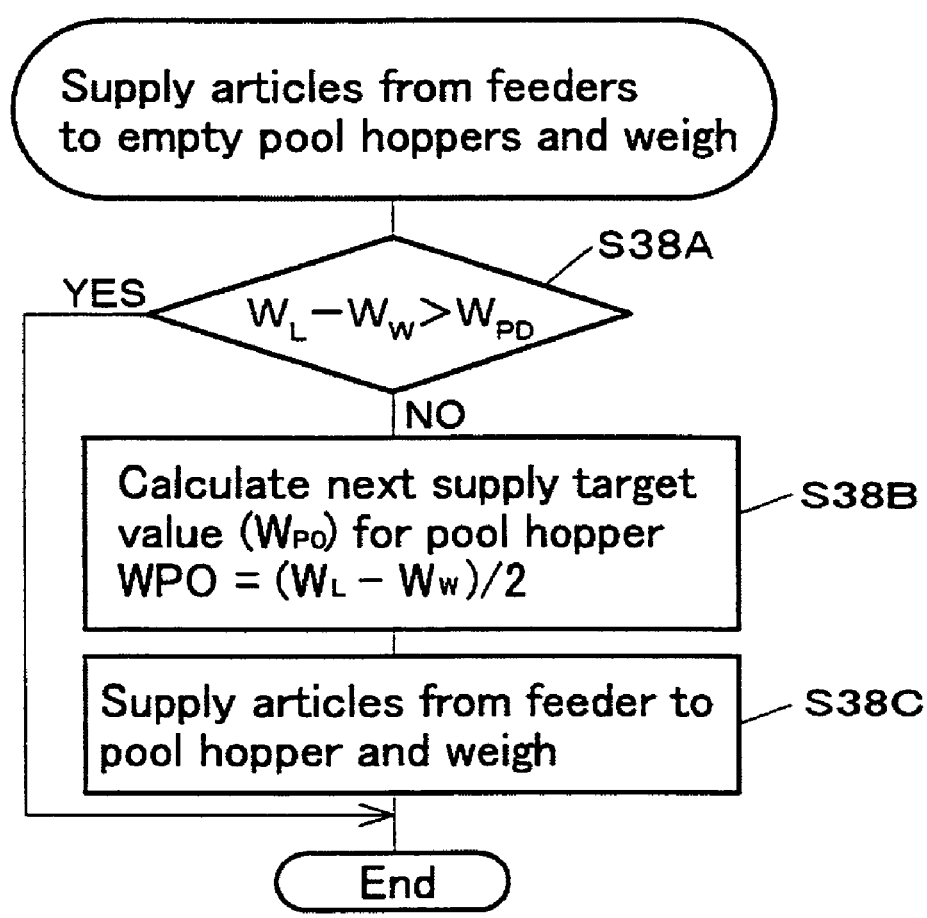
FIG. 15 is a flowchart that illustrates the details of Step S38 in FIG. 14.

Next, FIGS. 14—16 describe a situation in which an additional amount of article X supplied from a pool hopper 15 to a predetermined weighing hopper 16 is controlled when the results of the primary combination calculation indicate that the primary combination is not complete. Note that subscripts are attached to each of the pool hoppers 15—15, weighing hoppers 16—16, and articles X—X shown in FIG. 16 and are employed in the description provided below, in order to more clearly explain the supply and discharge of the articles X—X.

As shown in FIG. 14, when the combination weighing device 1 begins operating, the supply target value $W_{PO}$ of articles X—X supplied from the feeders 14—14 to the pool hoppers 15—15 is set to a default supply target value $W_{PD}$ in Step S21. The control in Steps S22 to Step S36 is approximately identical with the control described in Steps S2 to S16, and thus a description thereof will be omitted.

At Step S36, after a quantity of article X that completes the secondary combination (i.e., a quantity that will complete the primary combination in the next primary combination calculation) is supplied to the empty target pool hopper 15 of the secondary combination calculation from a feeder 14, the weight value of the article X is input. Then in Step S37, it is determined whether or not there is an empty pool hopper 15 that supplies additional article X to a target weight hopper 16. In FIG. 12(a), the pool hopper $15_3$ corresponding to a target weighing hopper $16_3$ that is to be supplied with additional article X is empty, and thus satisfies this requirement.

Figure 16A:
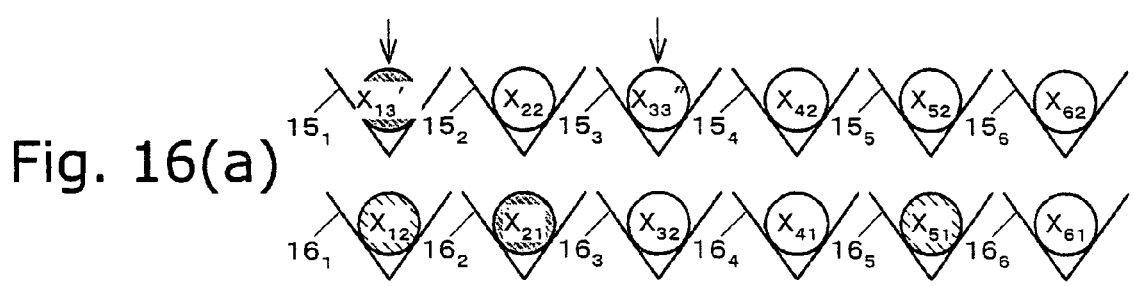
FIG. 16($a$) is schematic diagram for describing an article supply/discharge operation in accordance with a modification D of the second embodiment of the present invention.
Figure 16B:
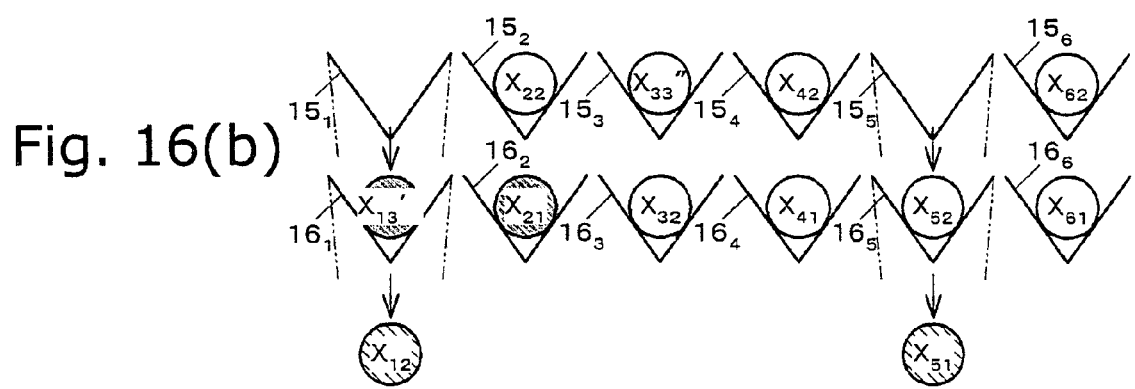

If the answer is determined to be "YES" in Step S37, after a suitable quantity of article X is supplied from a feeder 14 to the empty pool hopper 15, the weight value of the article X is input in Step S38. In FIG. 16(a), a suitable quantity of article $X_{33}$" is supplied to the empty pool hopper $15_3$. Note that a sufficient quantity of article $X_{13}$' that completes the secondary combination noted in Step S36 is supplied to the pool hopper $15_1$. In addition, the primary combination is complete with articles $X_{12}$, $X_{51}$ stored in two weighing hoppers $16_1$, $16_5$.

Step S38 will be described here in detail. As shown in FIG. 15, in Step S38A it is determined whether or not a value $W_L-W_W$ obtained by subtracting the weight value $W_W$ of article $X_{32}$ in the weighing hopper $16_3$ from a predetermined weight limit value $W_L$ of the weighing hopper $16_3$ exceeds the supply target value $W_{PD}$. The weight limit value $W_L$ is the maximum weight of article X that can be supplied to a weighing hopper 16 without resulting in an over-scale state. Note that an over-scale state is also created by supplying a volume of article X that exceeds the maximum allowable capacity of a weighing hopper 16. However, in this situation, the density of article X may be used to convert the value of the maximum allowable capacity to a maximum allowable weight value, and this maximum allowable weight value may be employed instead of the weight limit value $W_L$.

If it is determined that the answer in Step S38A is "NO", then in Step S38B the supply target value $W_{PO}$ of a next article $X_{33}''$ supplied to the pool hopper $15_3$ is set to a value obtained by dividing the aforementioned value $W_L - W_W$ by 2. Then in Step S38C, after article $X_{33}''$ is supplied from a feeder 14 to the pool hopper $15_3$, the weight value of the article $X_{33}''$ is input. Note that in this example the value $W_L - W_W$ is divided by 2, but any value between 1–3 can be normally employed.

Then, if it is determined that the answer in Step S38A is "YES", then the process proceeds to Step S39. On the other hand, if it is determined that the answer in Step S38A is "NO", then Steps S38B, S38C are executed, and the process proceeds to Step S39 in FIG. 14. The supply target value $W_{PO}$ of the articles X—X supplied from the feeders 14—14 to the pool hoppers 15—15 is set as the default supply target value $W_{PD}$ in Step S39. Then at Step S40, after a normal amount of articles X—X are supplied from the feeders 14—14 to the empty pool hoppers 15—15 other than the two pool hoppers $15_1$, $15_5$, the weight values of these articles X—X are input. In the example shown in FIG. 16(a), no pool hopper 15 satisfies this requirement.

After Step S40, the process returns to Step S28, and articles $X_{12}$, $X_{51}$ are discharged from the weighing hoppers $16_1$, $16_5$ selected in the primary combination calculation. Then, at Step S29, after articles $X_{13}'$, $X_{52}$ are supplied from the pool hoppers $15_1$, $15_5$ corresponding to the weighing hoppers $16_1$, $16_5$ that discharged the articles $X_{12}$, $X_{51}$, the weight values of these articles $X_{13}'$, $X_{52}$ are input (see FIG. 16(b)).

Here, article $X_{33}''$ stored in the pool hopper $15_3$ will not result in an over-scale state, even if the article $X_{33}''$ is an additional supply that is provided to the weighing hopper $16_3$ targeted for additional supply when the primary combination is not complete, because article $X_{33}''$ is supplied with the supply target value $W_{PO}$ obtained by dividing the value $W_L - W_W$ by 2.

On the other hand, if it is determined that the answer in Step S34 is "YES" or that the answer in Step S35 is "NO", then the process will continue to Step S37 and control will be executed. Then, if it is determined that the answer is "NO" in Step S37, the process proceeds to Step S40 and control will continue to be executed.

By performing this type of process, when the results of a primary combination calculation indicated that a primary combination is not complete, and an additional quantity of article X is supplied from a pool hopper 15 corresponding to a predetermined weighing hopper 16 that receives this supply, the quantity of article X supplied from a feeder 14 to the pool hopper 15 will be controlled to a suitable quantity so that an over-scale state is not produced in the previously selected weighing hopper 16. In other words, an over-scale state that causes the combination weighing device 1 to cease operations will be avoided.

<Modification E>

Figure 17:
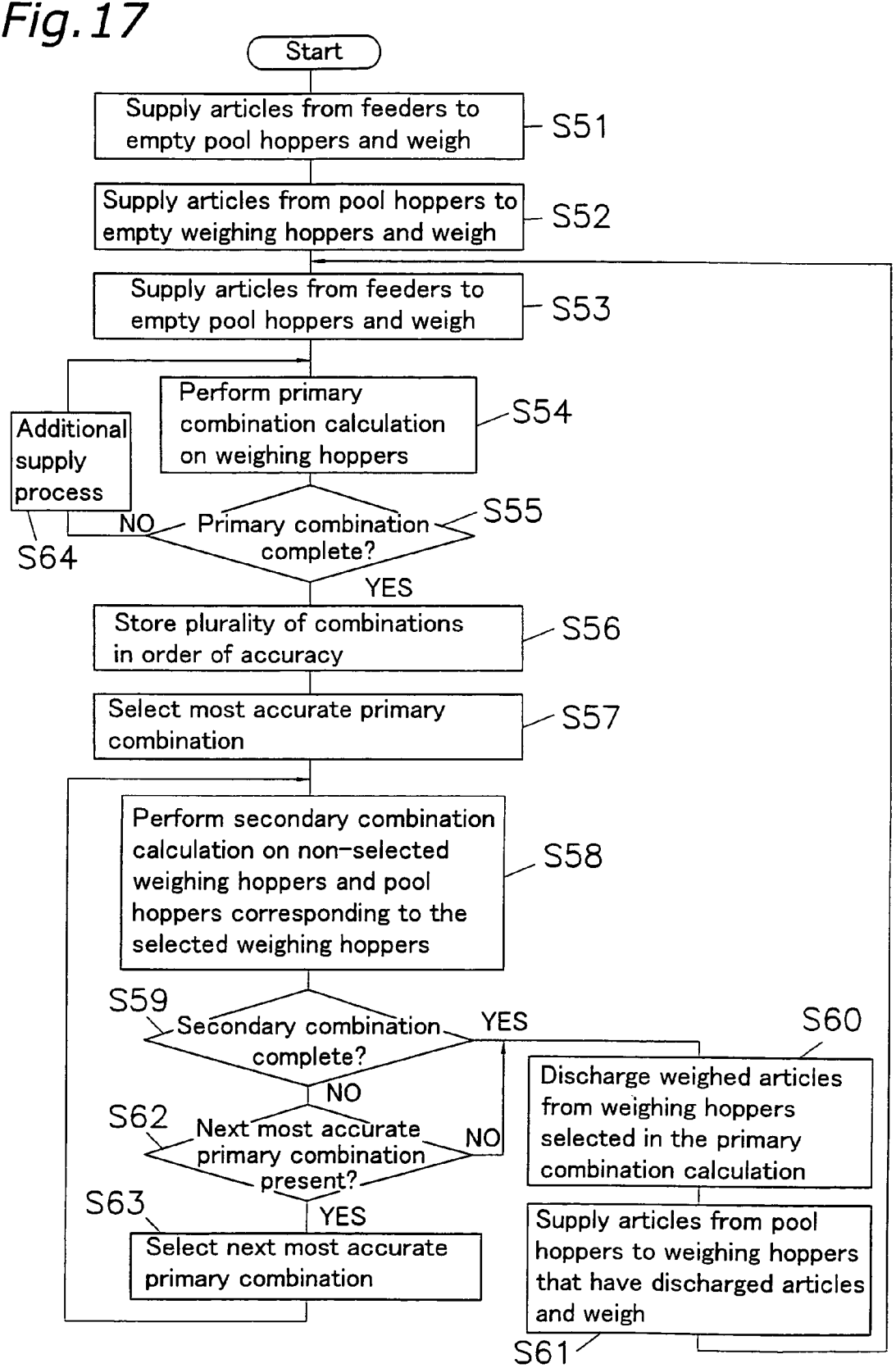
FIG. 17 is a flowchart for describing another control in accordance with a modification E of the second embodiment of the present invention.

Next, FIGS. 17 and 18 describe a situation in which the process is controlled so that when the results of a secondary combination calculation indicate that a secondary combination is not complete, a secondary combination from the secondary combination calculation that is complete will be selected from a plurality of primary combinations obtained when a primary combination calculation is performed prior to the secondary combination calculation. Note that subscripts are attached to each of the pool hoppers 15—15, weighing hoppers 16—16, and articles X—X shown in FIG. 18 and are employed in the description provided below, in order to more clearly explain the supply and discharge of the articles X—X.

As shown in FIG. 17, when the combination weighing device 1 begins operating, and after the feeders 14—14 are driven and a predetermined quantity of articles X—X are supplied to the empty pool hoppers 15—15 at Step S51, the weight values of these articles X—X are input. Here, because this is immediately after the combination weighing device 1 began operation, pool hoppers $15_1$–$15_6$ are all empty at first, and then articles $X_{11}$–$X_{61}$ are supplied to and respectively stored in the pool hoppers $15_1$–$15_6$ (see FIG. 11(a)).

At Step S52, after articles X—X are supplied from the pool hoppers 15—15 to the weighing hoppers 16—16, the weight values of the articles X—X are input. Then at Step S53, articles X—X are supplied from the feeders 14—14 to the empty pool hoppers 15—15. In this situation, because this is immediately after the combination weighing device 1 began operation, weighing hoppers $16_1$–$16_6$ are all empty at first, and then the articles $X_{11}$–$X_{61}$ are respectively supplied to and stored in the weighing hoppers $16_1$–$16_6$. On the other hands, articles $X_{12}$–$X_{62}$ supplied this time are respectively stored in the pool hoppers $15_1$–$15_6$ (see FIGS. 11(a) and 11(b)).

Figure 18A:
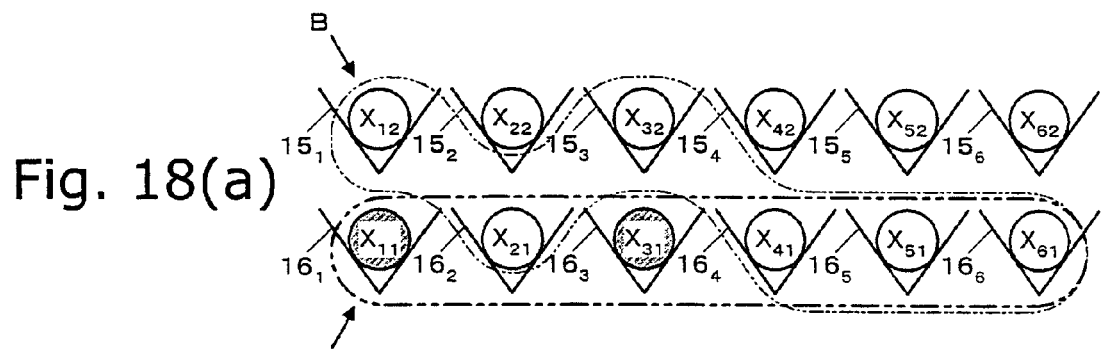
FIG. 18(a) is schematic diagram for describing an article supply/discharge operation in accordance with the modification E of the second embodiment of the present invention.

At Step S54, a primary combination calculation is performed on the weighing hoppers 16—16, and at Step S55, it is determined whether or not the combination weight of the primary combination is complete with respect to the target weight based upon the results of the primary combination calculation. The target group of the primary combination calculation is shown in FIG. 18(a) encircled with a thick dotted line and labeled "A".

If it is determined that the answer is "YES" in Step S55, then a plurality of primary combinations are stored in the memory 20a in the order of their degree of accuracy with respect to the target weight. In this situation, the most accurate combination is the two weighing hoppers $16_1$, $16_3$, i.e., the articles $X_{11}$, $X_{31}$.

A secondary combination calculation is performed at Step S58 on the weighing hoppers 16—16 not selected in the primary combination and the pool hoppers 15—15 corresponding to the selected weighing hoppers 16—16. The target group of the secondary combination calculation is shown in FIG. 18(a) encircled with a thin dotted line and labeled "B".

At Step S59, it is determined whether or not the secondary combination has a combination weight that is complete with respect to the target weight based on the results of the secondary combination calculation. If it is determined that the answer is "YES" in Step S59, then in Step S60 the articles X—X are discharged from the hoppers 16—16 selected in the primary combination calculation. Then in Step S61, after new articles X—X are supplied from the pool hoppers 15—15 corresponding to the weighing hoppers 16—16 that just discharged articles X—X, the weight values of the articles X—X are input and the process returns to Step S53.

On the other hand, if it is determined that the answer is "NO" in Step S59, then at Step S62 it is determined whether or not a next most accurate primary combination is available. The target group of the secondary combination calculation shown in FIG. 18(a) encircled with a thin dotted line and labeled "B" does not have a secondary combination that is complete.

Figure 18B:
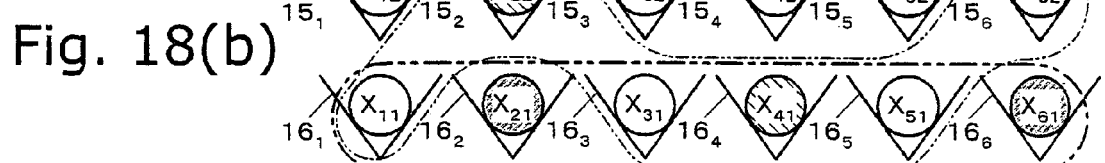
FIG. 18(b) is schematic diagram for describing an article supply/discharge operation in accordance with the modification E of the second embodiment of the present invention.
Figure 18C:
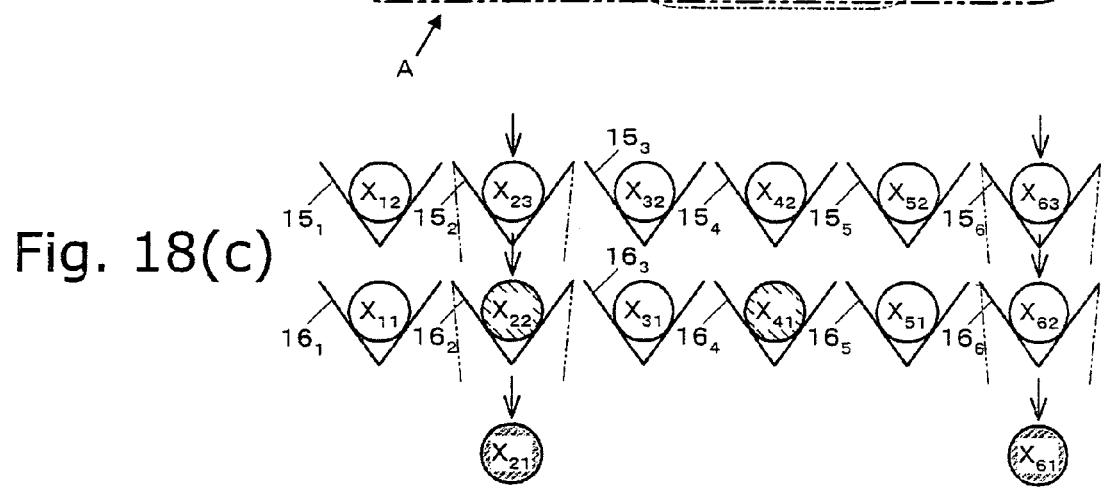
FIG. 18(c) is schematic diagram for describing an article supply/discharge operation in accordance with the modification E of the second embodiment of the present invention.

If it is determined that the answer is "NO" in Step S62, then this means that a next most accurate primary combination is not available, and thus the process will return to Step S60. On the other hand, if it is determined that the answer is "YES" in Step S62, then after that primary combination is selected from the plurality of primary combinations stored in the memory 20a in Step S63, the process will return to Step S58 and a secondary combination calculation will be performed again. As shown in FIG. 18(b), the two weighing hoppers $16_2$, $16_6$, i.e., the articles $X_{21}$, $X_{61}$, is the next most accurate primary combination from amongst the target group labeled "A" of the primary combination calculation, and a complete secondary combination is one weighing hopper $16_4$, i.e., the article $X_{41}$ and one pool hopper $15_2$, i.e., the article $X_{22}$, selected from the target group labeled "B" of the secondary combination calculation.

In other words, because it was determined that the answer was "YES" in Step S59 in this example, the process continues to Step S60, the discharge of the articles $X_{11}$, $X_{31}$ from the weighing hoppers $16_1$, $16_3$ selected as the most accurate primary combination in the primary combination calculation was cancelled, and the articles $X_{21}$, $X_{61}$ will be discharged from the weighing hoppers $16_2$, $16_6$ selected as the next most accurate primary combination. Then at Step S61, after articles $X_{22}$, $X_{62}$ are supplied from the pool hoppers $15_2$, $15_6$ corresponding to the weighing hoppers $16_2$, $16_6$ that discharged the articles $X_{21}$, $X_{61}$, the weight values of these articles $X_{22}$, $X_{62}$ are input. Then the process returns to Step S53, and after the feeders 14, 14 are driven to supply articles $X_{23}$, $X_{63}$ to the empty pool hoppers $15_2$, $15_6$, the weight values of these articles $X_{23}$, $X_{63}$ are input. As can be clearly seen in the examples, in the next primary combination calculation, the primary combination will be complete with the two weighing hoppers $16_2$, $16_4$, i.e., articles $X_{22}$, $X_{41}$ (see FIG. 18(c)).

Note that if it is determined that the answer is "NO" in Step S55, then after additional article X is supplied from a pool hopper 15 corresponding to a predetermined weighing hopper 16, the process will return to Step S54.

By performing this type of process, a plurality of primary combinations will be calculated during a primary combination calculation and will be stored in the memory 20a in the order of their accuracy, and when a secondary combination is not complete when a secondary combination calculation based upon the most accurate primary combination is performed, a secondary combination calculation based upon the next most accurate primary combination can be performed. In other words, a primary combination that completes a secondary combination during a secondary combination calculation can be selected from amongst the primary combinations during a primary combination calculation. Thus, the accuracy of a combination can be maintained while the next primary combination is completed.

<Modification F>

Figure 20:
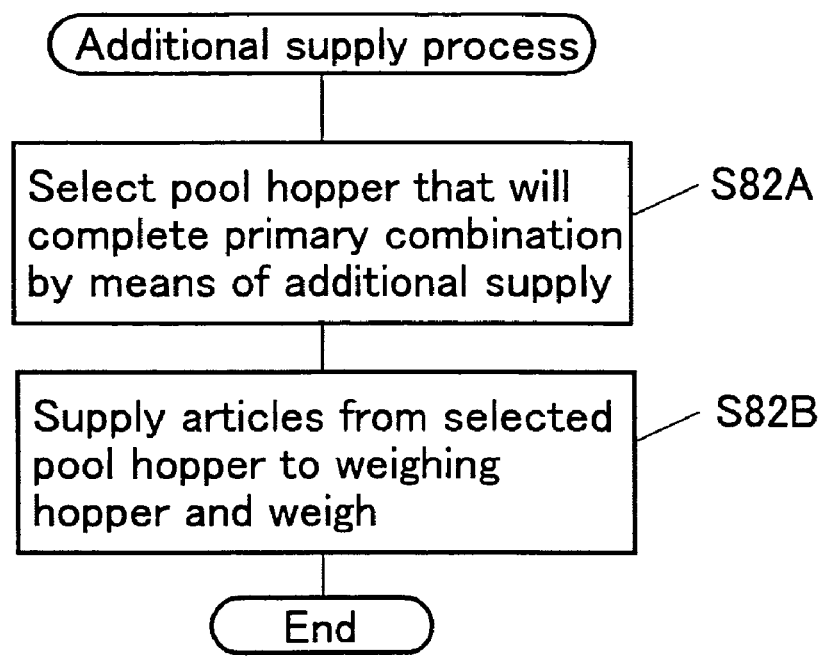
FIG. 20 is a flowchart that illustrates the details of Step S82 in FIG. 19.

FIGS. 19 and 20 describe an example in which the combination weighing device 1 is controlled to select a pool hopper 15 that will complete a primary combination by supplying stored article X to a weighing hopper 16 when the results of a primary combination calculation indicate that a primary combination is not complete.

In the flowchart shown in FIG. 19, the control other than Step 82 is identical to the control other than Step S12 in FIG. 9, and thus a description thereof will be omitted.

In other words, if it is decided that the answer is "NO" in Step S76 or Step S81, the process will continue to Step S82. A detailed description of Step S82 is shown in FIG. 20. A pool hopper 15 that will complete a primary combination by supplying additional stored article X to the corresponding weighing hopper 16 is selected at Step S82A. Then at Step S82B, after additional article X is supplied from the selected pool hopper 15 to the corresponding weighing hopper 16, the weight value from the weighing hopper 16 is input.

Then after Step S82, the process returns to Step S75 and a primary combination calculation is performed on the weighing hoppers 16—16.

By performing this type of process, even if the results of a primary combination calculation indicate that a primary combination is not complete, additional article X will be supplied from a pool hopper 15 to a weighing hopper 16 so that the primary combination will be complete. Because of this, supplying additional articles is more effective when a primary combination is not complete.

In addition, although a description thereof is omitted, Step S32 in FIG. 14 or Step S64 in FIG. 17 may be modified to control the process in the same way as that in Step S82.

Note that in the aforementioned embodiment, the weights of the articles X—X supplied are first measured by the weight detectors 15a—15a of the pool hoppers 15—15, and then the weights of the articles X—X are confirmed by the weight detectors 16a—16a of the weight hoppers 16—16. Thus, the weight detectors 15a—15a of the pool hoppers 15—15 may be compared to the weight detectors 16a—16a of the weighing hoppers 16—16 and set to a low weighing accuracy in accordance with need (by for example shortening the weighing times), or the weight detectors may be replaced with those having a lower weighing accuracy. This makes it possible to maintain a predetermined weighing accuracy while reducing costs and increasing the speed of the process.

On the other hand, the weight detectors 16a—16a of the weighing hoppers 16—16 can be omitted by making the weighing accuracy of the weight detectors 15a—15a of the pool hoppers 15—15 the same as that presently required with the weight detectors 16a—16a of the weighing hoppers 16—16. In this situation, both the articles X—X and the weights of the articles X—X will be sent from the pool hoppers 15—15 to the weighing hoppers 16—16. This allows the weighing operation by the weighing hoppers 16—16 to be omitted, and thus the burden on the control unit 20 can be reduced and a predetermined weighing accuracy can be maintained while reducing costs and increasing the speed of the process.

In addition, the feeders 14—14, the pool hoppers 15—15, and the weighing hoppers 16—16 of the combination weighing device 1 according to the aforementioned embodiment are arranged in a circular shape when viewed from above, but the effects of the present invention described above will be obtained even if the combination weighing device 1 is arranged in a linear shape.

Then, articles X—X from the pool hoppers 15—15 may be discharged in both the direction of the weighing hoppers 16—16 and the direction of the individual chutes 17—17. In addition, booster hoppers may be arranged below the corresponding weighing hoppers 16—16, and articles X—X from the weighing hoppers 16—16 may be discharged both in the direction of the booster hoppers and the direction of the individual chutes 17—17. This allows the number of weights participating during a combination calculation to be reliably increased, and thus the combinations will fall within an allowable range with a high probability.

As described above, the present invention provides a combination weighing device that is capable of improved operational efficiency. In other words, the present invention relates to a combination weighing device that weighs articles with a plurality of weighing devices and, based upon the results of this weighing, measures the articles into a predetermined target weight, and thus is widely suitable in the technical field of article weighing devices.

As used herein, the following directional terms "forward, rearward, above, downward, vertical, horizontal, below and transverse" as well as any other similar directional terms refer to those directions of an apparatus equipped with the present invention. Accordingly, these terms, as utilized to describe the present invention should be interpreted relative to an apparatus equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2002-356363 and 2002-358920. The entire disclosure of Japanese Patent Applications Nos. 2002-356363 and 2002-358920 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A combination weighing device, comprising:
   a plurality of sets of hoppers, each set having a first hopper that stores articles and a second hopper that is disposed above the first hopper to supply articles to the first hopper;
   a plurality of measuring devices that are arranged with respect to each of the plurality of first hoppers and plurality of second hoppers, the plurality of measuring devices measuring articles in the first hoppers and second hoppers;
   calculation means that performs combination calculation based on measurement values of articles of the first hoppers provided by the measuring devices;
   determining means that determines whether or not a total measurement value of articles in first and second hoppers of one of the sets of hoppers exceeds a predetermined value when the combination calculation performed by the calculation means is not complete; and
   additional supply means that supplies additional articles from the second hopper to the first hopper when the determining means determines that the total measurement value does not exceed the predetermined value.

2. The combination weighing device set forth in claim 1, wherein
   the determining means determines whether or not the total measurement value of articles in first and second hoppers of another set of hoppers exceeds the predetermined value.

3. The combination weighing device set forth in claim 1, wherein
   the measurement value is a weight of articles in the first hopper that can be measured by the weighing device.

4. The combination weighing device set forth in claim 1, wherein
   the predetermined value is a value based upon article density and the volume of articles that the first hopper can accommodate.

5. The combination weighing device set forth in claim 1, further comprising:
   a plurality of feeders that respectively correspond to each of the plurality of second hoppers, the plurality of feeders supplying articles to the corresponding second hoppers;
   supply quantity control means that controls a quantity of articles to be supplied from the feeders to the second hoppers; and
   setting means that sets a supply target value of articles to be supplied by one of the feeders to one of the second hoppers based upon the total measurement value of articles in the set of the first and second hoppers and the predetermined measurement value;
   wherein the supply quantity control means controls the quantity of articles to be supplied to the second hopper of the set of hoppers based upon the measurement value of articles in the second hopper so that the quantity of articles supplied from the feeder to the second hopper equals the supply target value.

6. The combination weighing device set forth in claim 5, wherein
   the supply quantity control means controls the quantity of article to be supplied from the feeders to the second hopper of the set of hoppers based upon a deviation between the measurement value of articles in the second hopper of the set of hoppers and the predetermined supply target value.

7. A combination weighing device, comprising:
   a plurality of first hoppers that store articles;
   a plurality of second hoppers that are disposed above the plurality of first hoppers, each second hopper respectively corresponding to each first hopper and supplying articles to the corresponding first hopper;
   a plurality of feeders that respectively correspond to each of the plurality of second hoppers, the plurality of feeders supplying articles to the corresponding second hoppers;
   supply quantity control means that controls the quantity of articles supplied from the feeders to the second hoppers;
   a plurality of measuring devices that are arranged with respect to each of the plurality of first hoppers and plurality of second hoppers, the plurality of measuring devices measuring articles in the first hoppers or second hoppers;
   setting means that sets a supply target value of articles to be supplied by one of the feeders to one of the second hoppers; and
   calculation means that performs combination calculation based on measurement values of articles of the first hoppers provided by the measuring devices; and wherein the supply quantity control means controls a quantity of article to be supplied from the one of the feeders to the one of the second hoppers based upon a deviation between the measurement value of the articles in the one of the second hoppers which the one of the feeders has supplied and the predetermined supply target value.

8. A combination weighing device, comprising:

a plurality of sets of hoppers, each set having a first hopper that stores articles and a second hopper that is disposed above the first hopper to supply articles to the first hopper;

a plurality of feeders that respectively correspond to each of the plurality of second hoppers, the plurality of feeders supplying articles to the corresponding second hoppers;

supply quantity control means that controls a quantity of articles to be supplied from the feeders to the second hoppers; and a plurality of measuring devices that are arranged with respect to each of the plurality of first hoppers and plurality of second hoppers, the plurality of measuring devices measuring articles in the first hoppers and second hoppers;

calculation means that performs combination calculation based on measurement values of articles of the first hoppers provided by the measuring devices; and additional supply means that supplies additional articles from the second hoppers to the first hoppers when the combination calculation performed by the calculation means is not complete;

wherein the supply quantity control means controls the quantity of articles to be supplied from the feeders to the second hoppers so that the total measurement value of the measurement value of articles in the first and second hoppers of a set of hoppers does not exceed the predetermined value.

9. A combination weighing device, comprising:

a plurality of sets of hoppers, each set having a first hopper that stores articles and a second hopper that is disposed above the first hopper to supply articles to the first hopper;

a plurality of measuring devices that are arranged with respect to each of the plurality of first hoppers and plurality of second hoppers, the plurality of measuring devices measuring articles in the first hoppers and second hoppers;

calculation means that performs combination calculation based on measurement values of articles of the first hoppers provided by the measuring devices;

determining means that determines whether the combination calculation performed by the calculation means is complete;

selection means that performs combination calculation based on measurement values of articles of the first and second hoppers when the combination calculation performed by the calculating means was not complete; and additional supply means that supplies articles from a second hopper selected by said selection means to a corresponding first hopper if the selection means selects the second hopper as a result of the combination calculation.

10. A combination weighing device, comprising:

a plurality of sets of hoppers, each set having a first hopper that stores articles and a second hopper that is disposed above the first hopper to supply articles to the first hopper;

a plurality of measuring devices that are arranged with respect to each of the plurality of first hoppers and plurality of second hoppers, the plurality of measuring devices measuring articles in the first hoppers and second hoppers;

calculation means that performs combination calculation based on measurement values of articles of the first hoppers provided by the measuring devices; and secondary calculation means that performs, when the combination calculation performed by the calculating means was complete, combination calculation based on measurement values of articles in the second hoppers and the first hoppers not selected in the combination calculation performed by the calculation means.

11. The combination weighing device set forth in claim 10, further comprising:

a plurality of feeders that respectively correspond to each of the plurality of second hoppers, the plurality of feeders supplying articles to the corresponding second hoppers; and supply quantity control means that controls a quantity of articles supplied from the feeders to the second hoppers;

wherein when the combination calculation performed by the secondary calculation means is not complete and when there is an empty second hopper, the supply quantity control means controls the quantity of articles to be supplied from the feeders to the empty second hopper such that the combination calculation performed by the secondary combination calculation means can be completed.

12. The combination weighing device set forth in claim 10, wherein the calculating means determines whether there is a plurality of combinations that completes the combination calculation, and selects from amongst that plurality of combinations a combination that allows the combination calculation performed by the secondary combination calculating means to complete.

* * * * *